(12) United States Patent
Liu

(10) Patent No.: US 10,027,486 B2
(45) Date of Patent: Jul. 17, 2018

(54) HOMOMORPHIC ENCRYPTION FOR DATABASE QUERYING

(71) Applicant: COMMONWEALTH SCIENTIFIC AND INDUSTRIAL RESEARCH ORGANISATION, Campbell, ACT (AU)

(72) Inventor: Dongxi Liu, Marsfield (AU)

(73) Assignee: COMMONWEALTH SCIENTIFIC AND INDUSTRIAL RESEARCH ORGANISATION, Campbell (AU)

(*) Notice: Subject to any disclaimer, the term of this patent is extended or adjusted under 35 U.S.C. 154(b) by 0 days.

(21) Appl. No.: 14/410,548

(22) PCT Filed: Jun. 21, 2013

(86) PCT No.: PCT/AU2013/000674
§ 371 (c)(1),
(2) Date: Dec. 22, 2014

(87) PCT Pub. No.: WO2013/188929
PCT Pub. Date: Dec. 27, 2013

(65) Prior Publication Data
US 2015/0295716 A1    Oct. 15, 2015

(30) Foreign Application Priority Data
Jun. 22, 2012 (AU) ................ 2012902653

(51) Int. Cl.
*H04L 9/32* (2006.01)
*H04L 9/00* (2006.01)
*H04L 9/06* (2006.01)

(52) U.S. Cl.
CPC ............ *H04L 9/3236* (2013.01); *H04L 9/008* (2013.01); *H04L 9/0618* (2013.01)

(58) Field of Classification Search
CPC ...... H04L 9/008; H04L 9/0618; H04L 9/3236
See application file for complete search history.

(56) References Cited

U.S. PATENT DOCUMENTS

| 2005/0147246 | A1 | 7/2005 | Agrawal et al. |
| 2006/0015944 | A1* | 1/2006 | Fields ............ G06F 21/606 726/27 |

(Continued)

FOREIGN PATENT DOCUMENTS

| CN | 1786963 A | 6/2006 |
| CN | 102314580 A | 1/2012 |

OTHER PUBLICATIONS

International Search Report and Written Opinion dated Sep. 6, 2013 of International Patent Application No. PCT/AU2013/000674, 13 pages.

(Continued)

*Primary Examiner* — Carl G Colin
*Assistant Examiner* — Vance M Little
(74) *Attorney, Agent, or Firm* — Kilpatrick Townsend & Stockton LLP

(57) ABSTRACT

This disclosure concerns homomorphic encryption for database querying. Numerical values are encrypted using keys and random numbers to produce a ciphertext. The ciphertext is homomorphic and is comprised of two or more sub-ciphertexts. Queries based on addition, average and multiplication operations can be performed without decrypting the numerical values relevant to the query. Each sub-ciphertext is stored in a single record and in separate attributes. There is disclosed methods of encrypting and decrypting, creating a suitable table, querying such a database and updating such a database.

19 Claims, 10 Drawing Sheets

(56) References Cited

U.S. PATENT DOCUMENTS

| | | | | |
|---|---|---|---|---|
| 2010/0146299 A1* | 6/2010 | Swaminathan ... | G06F 17/30666 | 713/189 |
| 2011/0243320 A1* | 10/2011 | Halevi ................... | H04L 9/008 | 380/30 |
| 2011/0264920 A1* | 10/2011 | Rieffel ................... | H04L 9/008 | 713/189 |
| 2012/0066510 A1* | 3/2012 | Weinman ................ | H04L 9/008 | 713/189 |

OTHER PUBLICATIONS

Hu, Haibo, et al., "Processing Private Queries Over Untrusted Data Cloud through Privacy Homomorphism", 2011, IEEE, pp. 601-612.

Li, Feifei, et al., "Authenticated Index Structures for Aggregation Queries", 2010, ACM, 36 pages, http://doi.acm.org/10.1145/1880022.1880026.

Liu, Dongxi, et al., "DEMO: Query Encrypted Databases Practically", Oct. 16-18, 2012, CCS-12, Raleigh, NC, pp. 1049-1051.

Popa, Raluca Ada, et al., "CryptDB: Protecting Confidentiality with Encrypted Query Processing", Oct. 23-26, 2011, SOSP '11, Cascais, Portugal, pp. 85-100.

Yildiz, Ustun, et al., "Enhancing Secured Service Interoperability With Decentralized Orchestration", 2007, IEEE, pp. 725-733.

Extended European Search Report, from PCT/AU2013/000674, dated Feb. 9, 2016, 12 pages.

English Translation of Office Action for corresponding Chinese Patent Application No. 201380043719.7 dated Dec. 29, 2016, 12 pages.

\* cited by examiner

| I1 | 1383.2 |
|---|---|
| I2 | 2965.8 |
| I3 | 1383.2 |
| I4 | 2965.7 |
| I5 | 3196.1 |

Fig. 5

| k1 | -735.3 | | s1 | 0.023 |
|---|---|---|---|---|
| K2 | 523.2 | | s2 | -0.015 |
| k3 | 5261.8 | | s3 | 0.0078 |

Fig. 6

| r11 | 178.2 |
|---|---|
| r21 | 7455.1 |
| r31 | 2946.8 |
| r41 | 132.3 |
| r51 | 1945.5 |

| r12 | 4789.3 |
|---|---|
| r22 | 409.2 |
| r32 | 9163.5 |
| r42 | -5734.4 |
| r52 | 905.3 |

| r13 | 378.8 |
|---|---|
| r23 | 7809.2 |
| r33 | -4236.3 |
| r43 | 89.34 |
| r53 | 6734.1 |

| p11 | 569.5 |
|---|---|
| p21 | 4658.2 |
| p31 | 793.8 |
| p41 | 6489.2 |
| p51 | -593.7 |

| p12 | -7836.1 |
|---|---|
| p22 | 5068.3 |
| p32 | 5723.9 |
| p42 | 1644.5 |
| p52 | 2789.1 |

| p13 | 1449.2 |
|---|---|
| p23 | 240.4 |
| p33 | -4372.3 |
| p43 | 2976.6 |
| p53 | 989.2 |

Fig. 7

|  | Share 1 | Share 2 | Share 3 |
|---|---|---|---|
| I1E1 | -1016888.76 | 728479.54 | 26137991.5 |
|  | k1*I1+r11 | k2*I1+r12 | k3*(r11+r12) |
| I2E1 | -2173297.64 | 1552115.76 | 41380373.74 |
|  | k1*I2+r21 | k2*I2+r22 | k3*(r21+r22) |
| I3E1 | -1014120.16 | 732853.74 | 63721976.54 |
|  | k1*I3+r31 | k2*I3+r32 | k3*(r31+r32) |
| I4E1 | -2180546.91 | 1545919.84 | -29477129.78 |
|  | k1*I4+r41 | k2*I4+r42 | k3*(r41+r42) |
| I5E1 | -2348146.83 | 1673104.82 | 15000339.44 |
|  | k1*I5+r51 | k2*I5+r52 | k3*(r51+r52) |

Fig. 8

| L | -212.1 |
|---|---|
|   | k1+k2 |

| I1D1 | 1383.2 |
|---|---|
|   | I1E11/L+I1E12/L-I1E13/(L*k3) |
| I2D1 | 2965.8 |
|   | I2E11/L+I2E12/L-I2E13/(L*k3) |
| I3D1 | 1383.2 |
|   | I3E11/L+I3E12/L-I3E13/(L*k3) |
| I4D1 | 2965.7 |
|   | I4E11/L+I4E12/L-I4E13/(L*k3) |
| I5D1 | 3196.1 |
|   | I5E11/L+I5E12/L-I5E13/(L*k3) |

Fig. 9

|   | Sum of Share 1 | Sum of Share 2 | Sum of Share 3 |
|---|---|---|---|
| SumIE1 | -8733000.3 | 6232473.7 | 116763551.4 |
|   | I1E11+I2E11+I3E11+I4E11+I5E11 | I1E12+I2E12+I3E12+I4E12+I5E12 | I1E13+I2E13+I3E13+I4E13+I5E13 |

| SumID1 | 11894 |
|---|---|
|   | SumIE11/L+SumIE12/L-SumIE13/(L*k3) |

Fig. 10

|   | Average of Share 1 | Average of Share 2 | Average of Share 3 |
|---|---|---|---|
| AvgIE1 | -1746600.06 | 1246494.74 | 23352710.29 |
|   | SumIE11/5 | SumIE12/5 | SumIE13/5 |

| AvgID1 | 2378.8 |
|---|---|
|   | AvgIE11/L+AvgIE12/L-AvgIE13/(L*k3) |

Fig. 11

|      | Share 1 | Share 2 | Share 3 |
|------|---------|---------|---------|
| I1E2 | -441967.6901 | -4105913.574 | -297870.3413 |
|      | k1*(s1*I1+p11)+r11 | k2*(s2*I1+p12)+r12 | k3*s3*(p11+p12+r11/k1+r12/k2) |
| I2E2 | -3467876.673 | 2628868.162 | 398811.3822 |
|      | k1*(s1*I2+p21)+r21 | k2*(s2*I2+p22)+r22 | k3*s3*(p21+p22+r21/k1+r22/k2) |
| I3E2 | -604126.8801 | 2993052.626 | 268054.0474 |
|      | k1*(s1*I3+p31)+r31 | k2*(s2*I3+p32)+r32 | k3*s3*(p31+p32+r31/k1+r32/k2) |
| I4E2 | -4821532.082 | 831393.1864 | 333366.4254 |
|      | k1*(s1*I4+p41)+r41 | k2*(s2*I4+p42)+r42 | k3*s3*(p41+p42+r41/k1+r42/k2) |
| I5E2 | 384440.9864 | 1435079.427 | 90066.11877 |
|      | k1*(s1*I5+p51)+r51 | k2*(s2*I5+p52)+r52 | k3*s3*(p51+p52+r51/k1+r52/k2) |

Fig. 12

| S | 0.008 |
|---|-------|
|   | s1+s2 |

| I1D2 | 1383.2 |
|------|--------|
|      | I1E21/(k1*S)+I1E22/(k2*S)-I1E23/(k3*s3*S) |
| I2D2 | 2965.8 |
|      | I2E21/(k1*S)+I2E22/(k2*S)-I2E23/(k3*s3*S) |
| I3D2 | 1383.2 |
|      | I3E21/(k1*S)+I3E22/(k2*S)-I3E23/(k3*s3*S) |
| I4D2 | 2965.7 |
|      | I4E21/(k1*S)+I4E22/(k2*S)-I4E23/(k3*s3*S) |
| I5D2 | 3196.1 |
|      | I5E21/(k1*S)+I5E22/(k2*S)-I5E23/(k3*s3*S) |

Fig. 13

|  | Sum of Share 1 | Sum of Share 2 | Sum of Share 3 |
|---|---|---|---|
| SumIE2 | -8951062.339 | 3782479.828 | 792427.6325 |
|  | I1E21+I2E21+I3E21+ I4E21+I5E21 | I1E22+I2E22+I3E22+ I4E22+I5E22 | I1E23+I2E23+I3E23+ I4E23+I5E23 |

| SumID2 | 11894 |
|---|---|
|  | SumIE21/(k1*S)+SumIE22/(k2*S)-SumIE23/(k3*s3*S) |

Fig. 14

|  | Average of Share 1 | Average of Share 2 | Average of Share 3 |
|---|---|---|---|
| AvgIE2 | -1790212.468 | 756495.97 | 158485.5265 |
|  | SumIE21/5 | SumIE22/5 | SumIE23/5 |

| AvgID2 | 2378.8 |
|---|---|
|  | AvgIE21/(k1*S)+AvgIE22/(k2*S)-AvgIE23/(k3*s3*S) |

Fig. 15

| | Share 1 | Share 2 | Share 3 |
|---|---|---|---|
| I1E3 | -25410.97496 | -7287.928103 | 6448.002877 |
| | k1*(s1*I1+p11/k2-r13/k3)+r11-p13 | k2*(s2*I1+p12/k3-r11/k1)+r12-p11 | k3*(s3*I1+p13/k1-r12/k2)+r13-p12 |
| I2E3 | -48397.91884 | -21715.98993 | 118627.7752 |
| | k1*(s1*I2+p21/k2-r23/k3)+r21-p23 | k2*(s2*I2+p22/k3-r21/k1)+r22-p21 | k3*(s3*I2+p23/k1-r22/k2)+r23-p22 |
| I3E3 | -17781.03209 | 180.2793508 | -14059.63909 |
| | k1*(s1*I3+p31/k2-r33/k3)+r31-p33 | k2*(s2*I3+p32/k3-r31/k1)+r32-p31 | k3*(s3*I3+p33/k1-r32/k2)+r33-p32 |
| I4E3 | -62107.29338 | -35240.75738 | 156533.3112 |
| | k1*(s1*I4+p41/k2-r43/k3)+r41-p43 | k2*(s2*I4+p42/k3-r41/k1)+r42-p41 | k3*(s3*I4+p43/k1-r42/k2)+r43-p42 |
| I5E3 | -51320.3999 | -21922.34905 | 118936.1947 |
| | k1*(s1*I5+p51/k2-r53/k3)+r51-p53 | k2*(s2*I5+p52/k3-r51/k1)+r52-p51 | k3*(s3*I5+p53/k1-r52/k2)+r53-p52 |

Fig. 16

| S | 0.0158 |
|---|---|
|  | s1+s2+s3 |

| I1D3 | 1383.2 |
|---|---|
|  | I1E31/(k1*S)+I1E32/(k2*S)+I1E33/(k3*S) |
| I2D3 | 2965.8 |
|  | I2E31/(k1*S)+I2E32/(k2*S)+I2E33/(k3*S) |
| I3D3 | 1383.2 |
|  | I3E31/(k1*S)+I3E32/(k2*S)+I3E33/(k3*S) |
| I4D3 | 2965.7 |
|  | I4E31/(k1*S)+I4E32/(k2*S)+I4E33/(k3*S) |
| I5D3 | 3196.1 |
|  | I5E31/(k1*S)+I5E32/(k2*S)+I5E33/(k3*S) |

Fig. 17

|  | Sum of Share 1 | Sum of Share 2 | Sum of Share 3 |
|---|---|---|---|
| Sum IE3 | -205017.6192 | -85986.74512 | 386485.6449 |
|  | I1E31+I2E31+I3E31+ I4E31+I5E31 | I1E32+I2E32+I3E32+ I4E32+I5E32 | I1E33+I2E33+I3E33+ I4E33+I5E33 |

| SumID3 | 11894 |
|---|---|
|  | SumIE31/(k1*S)+SumIE32/(k2*S)+SumIE33/(k3*S) |

Fig. 18

|  | Average of Share 1 | Average of Share 2 | Average of Share 3 |
|---|---|---|---|
| AvgIE3 | -41003.52383 | -17197.35 | 77297.12897 |
|  | SumIE31/5 | SumIE32/5 | SumIE33/5 |

| AvgID3 | 2378.8 |
|---|---|
|  | AvgIE31/(k1*S)+AvgIE32/(k2*S)+AvgIE33/(k3*S) |

Fig. 19 rotateL((V1,V2,...,Vn), 1) = (V2,...,Vn,V1)
rotateL((V1,V2,...,Vn), n) = rotateL(rotateL((V1,V2,...,Vn), n-1), 1)

rotateR((V1,V2,...,Vn), 1) = (Vn,V1,V2,...)
rotateR((V1,V2,...,Vn), n) = rotateR(rotateR((V1,V2,...,Vn), n-1), 1)

Fig. 20

HOMOMORPHIC ENCRYPTION FOR DATABASE QUERYING

TECHNICAL FIELD

This disclosure concerns homomorphic encryption for database querying.

The disclosure includes computer implemented methods for encryption of numerical values to be stored in a database, decrypting ciphertext stored in a database, performing an aggregation and multiplication queries on a database storing ciphertext, creating a table in a database to store ciphertext, and inserting a record comprising ciphertext.

Other aspects include a database, software and computer systems.

A person skilled in the art has known to them, amongst other things, general computer system, including hardware and software.

BACKGROUND ART

Databases are an integral part in many applications, such as financial applications and medical eHealth applications. The databases might be very sensitive, containing valuable data to an enterprise or individuals. The theft of sensitive data is a growing concern for individuals, businesses and governments.

Databases are managed by using Database Management System (DBMSs), such as Oracle Database, MySQL, Microsoft SQL Server, etc. A database can be deployed on a server within an enterprise, on a virtual server in a cloud, or on a DBMS service in a cloud. The data theft is a concern for each type of deployment.

When databases are deployed on a server within the premises of an enterprise, the server is physically under the control of the enterprise. If the server is compromised or infected with malware or viruses, attackers might be able to access the raw database data file and steal the data by circumventing any enterprise access control mechanism. On the other hand, the database administrators in the enterprise have the opportunity to breach the privacy and integrity of data intentionally or accidentally since they can access the stored data for performing the database management tasks.

A database system can also be deployed by an enterprise on a virtual server, which runs on a cloud like the Amazon Elastic Compute Cloud (Amazon EC2). In this case, the virtual server underlying the database is physically under the control of the cloud provider, and onto the virtual server the enterprise installs DBMS to manage their databases. Similar to the above case, the data theft also happens in this case if the cloud infrastructure is compromised by attackers, infected with malware or viruses, and the enterprise database administrators might breach the privacy and integrity of databases. Moreover, if the cloud providers are not trustworthy; they can steal the database data in virtual servers provided by them.

There are currently DBMS services provided by cloud providers, such as Amazon Relational Database Service (Amazon RDS) and Microsoft SQL Azure Database. By using DBMS service, an enterprise can put their databases in a virtual DBMS on the cloud. In this case, the enterprise does not need to buy and install their own DBMS software, and the cost of hiring highly-skilled database administrators (DBA) may be reduced. The cloud providers are responsible for the management, upgrading and performance tuning of the database systems. Similarly, an attack or virus infection can steal the data if the database service is compromised.

Also, since the databases are directly under the management of the cloud providers, the providers can steal the enterprise data easily just by using the standard database access interface.

The straightforward approach to the data theft problem of databases is to encrypt the data in databases. That is, data are encrypted when stored into a database, or the entire data file is encrypted, as allowed by Microsoft SQL Server 2008 and Oracle 10g Database. In this way, the data in the database are protected from the attackers who compromise the server and the database administrators if they do not know the encryption keys. However, after encrypted, the database can no longer be directly queried in Microsoft SQL Server 2008 and Oracle 10g database, or the data has to be decrypted before performing a query.

SUMMARY OF THE INVENTION

In a first aspect, there is provided a computer implemented method for encryption of a numerical value to be stored in a database, the method comprising:

using additive homomorphic encryption, determining ciphertext for the numerical value, wherein the ciphertext is comprised of two or more sub-ciphertexts; and causing each sub-ciphertext to be stored separately and in a single record in the database.

It is an advantage that the numerical (plaintext) value is not encrypted as a single ciphertext. Any ciphertext or plaintext attack to determine the numeric value will need to decrypt multiple sub-ciphertexts making the encryption method robust. Moreover, without access to the database schema (which may obscure the nature of the attributes, for example, of a table of the database by use of appropriately uninformative names), a malevolent third party may not know how many, nor which, sub-ciphertexts represent which plaintext value.

Further, storing the sub-ciphertext separately means that the sub-ciphertext is also stored separately from the other values in the record. This provides greater flexibility, including the ability to perform queries on particular values that comprise a record without needing to decrypt the entire record.

Importantly, it is a further advantage that the encryption is additive homomorphic. That allows aggregate queries, such as queries utilising sum and average operations, to be performed on the numerical value in the database without decrypting the ciphertext.

The additive homomorphic encryption may also be multiplicative homomorphic.

The step of determining the ciphertext may be based on a key that is comprised of a set of key components, wherein the number of key components in the set of key components is equal to the number of sub-ciphertexts.

Each key component may be comprised of one or more sub-components, and key or each key sub-component may be an encryption key.

It is an advantage that the use of multiple key components makes the encryption method robust to ciphertext or plaintext attacks. The more sub-ciphertexts means more keys are used and in turn the more secure the encryption is. It is a further advantage that the robustness of the encryption can be increased without increasing the storage size of each sub-ciphertext.

Each key component may be based on the number of sub-ciphertexts that comprise the ciphertext.

The method may further comprise:
determining the set of key components based on the number of sub-ciphertexts.

It is an advantage that the method is adaptable for use with two or more sub-ciphertexts, including a large number of sub-ciphertexts.

The key may satisfy the following equation:

$$\Sigma_{i=1}^{n} f_i(K(n))*\text{Value}_i(K(n),V)=V$$

where
V is the value,
n is the number of sub-ciphertexts,
K(n) is the key,
$f_i$ is a i th function over the key, and
$\text{Value}_i$ is a i th function over K(n) and V.

$f_i$ and $\text{Value}_i$ may have a linear time complexity with respect to n.

Determining the ciphertext may comprise determining the sub-ciphertexts to satisfy the following equation:

$$\Sigma_{i=1}^{n} f_i(K(n))*V_i=V$$

where
V is the value,
n is the number of sub-ciphertexts,
K(n) is the key,
$f_i$ is a i th function over the key, and
$V_i$ is a i th sub-ciphertext.

$f_i$ may have a linear time complexity with respect to n.

It is an advantage that this embodiment does not require knowledge of the maximal sum of all possible inputs and is suited for use in existing databases without modification and where aggregate values need not be bound. It is also an advantage that the number of records to be added to the database need not be known at the time of encryption and the numbers of ciphertext records that can be added to the database can be arbitrarily large. This advantage is achieved without the use of the modulo or floor arithmetic operations that reduces the robustness of the encryption method and accuracy of queries performed on the ciphertexts.

Determining the ciphertext may comprise determining the sub-ciphertexts that satisfy the following equation:

$$V_i=\text{Value}_i(K(n),V)+\text{Noise}_i(K(n),R)$$

where
V is the value,
n is the number of sub-ciphertexts,
K(n) is the key,
R is a set of random numbers,
$V_i$ is the i th sub-ciphertext,
$\text{Value}_i$ is a i th function over K(n) and V, and
$\text{Noise}_i$ is a i th function over K(n) and R.

$\text{Value}_i$ and $\text{Noise}_i$ may have a linear time complexity with respect to n.

Each sub-ciphertext may comprise adding a first result and a second result, where the a first result is the value of a function based on a key associated with that sub-ciphertext and the numerical value, and the second result is the value of a function based on the key associated with that sub-ciphertext and one or more random numbers.

Both functions may have linear time complexity with respect to the number of sub-ciphertexts, that is the functions are not in exponential time complexity with respect to the number of sub-ciphertexts, hence scalable to increase the sub-ciphertext number.

Determining the ciphertext may be linear in complexity to the storage size of the keys.

Determining each sub-ciphertext may be based on a multiplication (or division) of the numeric value and a key. The key may be unique to that numeric value, as compared to other numeric values also encrypted by this method that are each associated with different keys.

Each sub-ciphertext may be based on either the whole numerical value or not at all. That is no summary, rounding or sub-part of the numerical value in determining the sub-ciphertexts.

Each sub-ciphertext may be independent of the other sub-ciphertexts of the numerical value. That is, a sub-ciphertext is not used in the determination of the other sub-ciphertexts of the numerical value.

The method may further comprise the steps of
determining a set of random number components;
wherein the step of determining the ciphertexts is further based on the set of random number components.

A random number component may comprise one or more random numbers.

It is an advantage that noise is introduced into the ciphertexts by the random numbers makes the resulting ciphertext difficult to break. In this case, the more sub-ciphertexts the more random numbers are used and in turn the more secure the encryption.

The step of determining the ciphertext may be based on a key that is comprised of a set of key components, wherein the number of key components in the set of key components is equal to the number of sub-ciphertexts, and the step of determining the set of random number components comprises determining a set of random numbers that satisfies the following equation:

$$\Sigma_{i=1}^{n} f_i(K(n))*\text{Noise}_i(K(n),R)=0$$

V is the value,
n is the number of sub-ciphertexts,
K(n) is the key,
$f_i$ is a i th function over the key,
R is a set of random number components; and
$\text{Noise}_i$ is a i th function over K(n) and R.

$f_i$ and $\text{Noise}_i$ may have a linear time complexity with respect to n.

It is an advantage of at least some embodiments that the method is customizable by following correctness conditions, that is, a user can define specific homomorphic encryption algorithms that meet the formulas above.

The equation may be composable and the method further comprising:
fusing the keys of the method of encryption of one or more instances of the method of encryption to create new instances of the method of encryption.

The database may store values in a structure comprised of attributes, and the step of causing each sub-ciphertext to be stored further comprises storing each sub-ciphertext in a separate attribute.

It is an advantage that the standard database structure can be used to store the ciphertext. Therefore the use of specially designed storage structures is avoided as there is no need to extend or change a current database management system and the standard protocols of using a database can still be used.

Each sub-ciphertext is of numerical value type.

The database may be a relational database.

The method may be repeated to cause ciphertext of multiple numerical values to be stored in the database, where each ciphertext is stored in the same table or related tables in a single database as separate records.

Since this encryption method is robust to ciphertext or plaintext chosen attacks, it is an advantage that the ciphertexts of different but related values can be stored in a single database and avoids the need to spread the ciphertexts between different databases to improve encryption robustness.

Each sub-ciphertext may be stored in the database as a numeric value type. It is an advantage that the sub-ciphertexts are not too large to be stored as numerical values. By storing the sub-ciphertexts as numerical values allows operations like summation and average to be performed on those sub-ciphertexts.

In a second aspect there is provided software, that is computer readable instructions stored on computer readable medium, that when executed by a computer causes the computer to perform the method of any one of the preceding claims.

In a third aspect there is provided a computer system for encryption of a numerical value to be stored in a database comprising:
   a processor to determine ciphertext for the numerical value using additive homomorphic encryption, wherein the ciphertext is comprised of two or more sub-ciphertexts; and to cause each sub-ciphertext to be stored separately and in a single record in the database.

The method may be performed by a security management system that is in communication with the database and the client application that is used by a user to query the database.

In yet another aspect there is a provided a database recorded on computer readable medium, wherein the database stores records having two or more attributes, wherein records each contain ciphertext representing a numeric value and determined using additive homomorphic encryption, the ciphertext is stored in the record as two or more sub-ciphertexts, and each sub-ciphertext is stored in a different attribute.

The numeric value may also be represented as a second ciphertext, the second ciphertext being different to the original ciphertext. The database may further comprise a second set of attributes to store the sub-ciphertexts of the second ciphertext. It is an advantage that redundant copies of the numerical value in the form of ciphertext is stored meaning that the second version can be used to verify any processing, such as querying, on the original ciphertext.

The database may be managed by a database management system (DBMS).

In a further aspect there is provided a computer implemented method for decrypting ciphertext stored in a database, the method comprising:
   receiving or accessing ciphertext determined using additive homomorphic encryption, wherein the ciphertext represents a numerical value and is comprised of two or more sub-ciphertexts; and
   decrypting the ciphertext based on each sub-ciphertext and using an encryption key comprised of a set of key components, wherein the number of key components is the same as the number of ciphertexts.

The method of decrypting, where appropriate, may satisfy the formulas set out above.

Further aspects of the above method include a computer system and software.

Another aspect provides a computer implemented method for performing an aggregation query on a database, wherein each numerical value subject of the query is stored as ciphertext determined using additive homomorphic encryption, the ciphertext is comprised of two or more sub-ciphertexts stored separately in a record, and each sub-ciphertext of a record is associated with a different attribute, the method comprising:
   for each attribute, aggregating each sub-ciphertext associated with that attribute to determine an encrypted aggregate value; and
   determine an encrypted answer to the query by aggregating each encrypted aggregate value.

Aggregating may be by a summation calculation or an average calculation. Each encrypted aggregate value may be arbitrarily large.

The method directly above further comprises:
   decrypting the encrypted answer to the query based on keys used to encrypt all the numerical values subject of the query.

The method directly above may further comprise:
   decrypting the encrypted answer to the query based on random numbers used to encrypt all the numerical values subject of the query.

Further aspects of the above method include a computer system and software.

Another aspect provides a computer implemented method for performing a multiplication based query on a database, wherein each numerical value subject of the query is stored as ciphertext determined using multiplicative homomorphic encryption, the ciphertext is comprised of two or more sub-ciphertexts stored separately in a record, the method comprising:
   for each pair of numerical values subject of the query, performing an outer product of the sub-ciphertexts of that pair of numerical values to determine an encrypted multiplied value.
decrypting the encrypted answer to the query based on keys used to encrypt all the numerical values subject of the query.

The method may further comprise aggregating the encrypted multiplied values. This may be by the method described directly above.

The method may further comprise multiplying the aggregated encrypted multiplied values in the manner described directly above. Further aspects of the above method include a computer system and software.

In yet another aspect there is provided a computer implemented method of creating a table in a database to store ciphertext representing numeric values and determined using additive homomorphic encryption, wherein each ciphertext is comprised of two or more sub-ciphertexts, wherein the method comprises:
   creating two or more attributes to each store a different sub-ciphertext of each ciphertext;
wherein the number of sub-ciphertexts is the same as the number of attributes created.

The encryption method used to determine each sub-ciphertext stored in an attribute may be the same but typically with different parameters, such as key values and random number values.

The order of the attributes in the table may be randomised.

The table may be associated with a table name, and the method may further comprise storing an encrypted version of the table name.

Each attribute may be associated with an attribute name, and the method may further comprise storing for each attribute an encrypted version of the associated attribute name.

Further aspects of the above method include a computer system and software.

In a further aspect there is provided a computer implemented method of inserting a record into a table in a database, the record comprising ciphertext that represents a numeric value and determined using additive homomorphic encryption, wherein the ciphertext is comprised of two or more sub-ciphertexts, wherein the method comprises:

inserting a record into the database, wherein each sub-ciphertext is stored in a different attribute.

Further aspects of the above methods include a computer system and software.

Optional features of the first aspect are where appropriate also optional features of the other aspects also described here.

BRIEF DESCRIPTION OF THE DRAWINGS

Non-limiting examples will now be described with reference to the following drawings in which:

FIG. 5 provides five numeric values;

FIG. 6 provides example key component values that comprise an encryption key;

FIG. 7 provides an example set of random number values;

FIGS. 8 to 11 show a first instance of a encryption, decryption and querying method using the values in FIGS. 5 to 7;

FIGS. 12 to 15 show a second instance of a encryption, decryption and querying method using the values in FIGS. 5 to 7;

FIGS. 16 to 19 show a third instance of a encryption, decryption and querying method using the values in FIGS. 5 to 7; and FIG. 20 shows the adjustment of shares within records/tuples to accommodate the randomised attributes/columns of a table.

BEST MODES

Introduction

Figure 1:
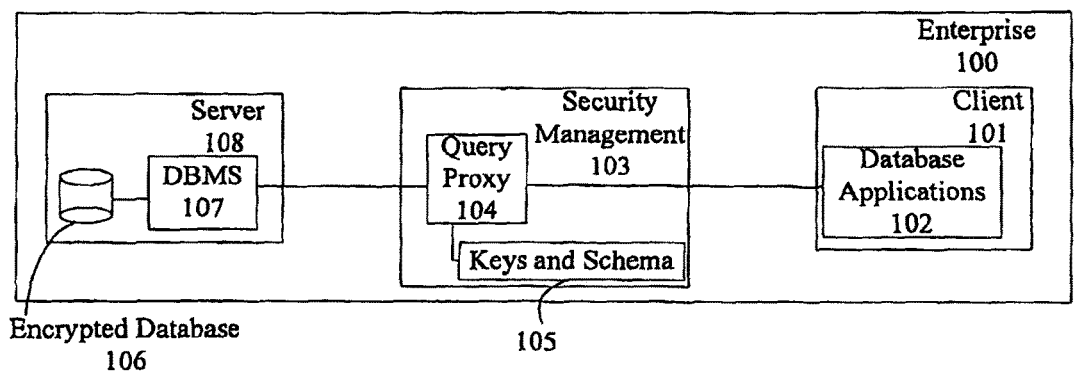
FIGS. 1 to 3 show different deployments (application environments) of a DBMS.

This example describes the use of technology, including cloud computing, that has application to a number areas or fields, which use databases to contain sensitive data, such as the financial databases in banks, the health records databases in hospital and insurance companies, the military and government databases, and other databases that are outsourced or deployed on cloud. According to this example, the database is secure even when the servers underlying the databases are compromised by attackers, infected by mal ware or viruses, or even managed by untrusted database administrators or database service providers.

This is achieved in this example by a homomorphic encryption method and system for encrypting numerical values and performing queries directly over the encrypted data in one or more databases. Specifically, in this example provides for performing aggregation operations of sum (SUM) and average (AVG) efficiently and without changing or extending current DBMSs. The example also includes the method of verifying the integrity of the query results.

In this example a numeric value (plain text) is encrypted into ciphertext that is comprised of multiple parts, each called a sub-ciphertext (secret share). The number of shares is determined by an encryption key. The secret shares can be stored into different attributes (columns) in a database table but in the same tuple (record when implemented in a database). Each share contains noises (random number), such that the same numeric value is encrypted into different ciphertext thus making the encryption robust against plain-text chosen attacks and ciphertext chosen attacks. The security of the encryption scheme is only dependent on the secrecy of the encryption keys.

To decrypt an encrypted value, the method instructs the DBMS to return all secret shares of that value. Combining these shares with the secret key allows the encrypted value to be decrypted from the shares.

To perform the aggregation operations of SUM and AVG on one table record or attribute, the method instructs the DBMS to perform SUM or AVG operations separately on each relevant share column of the attribute, and then the expected sum or average can be decrypted from the sum or the average of aggregated shares if secret key is known.

To perform the multiplication on two attribute values, the method instructs the DBMS to calculate the outer product of two vectors of subciphertexts, each of which corresponds to the ciphertext of one attribute value, and then the multiplication can be decrypted from the outer product if secret key is known. The multiplication of attribute values can be aggregated further.

This example also provides for the verification of the integrity of the query results, including the results of SUM and AVG. This involves storing a value into redundant copies, with each copy having their encrypted shares in the database tables. A query is performed on each copy and then its result is verified by comparing the result on each copy, which should equal if the shares underlying the results not tampered.

In this example, a database is designed by defining database schema (tables and their attributes) in the manner understood by a person skilled in the art. However, when implementing the database design in a DBMS, tables and their attributes are created with meaningless hash values as their names. In addition, an attribute in the design is usually implemented into several attributes, each of which corresponds to either a secret share generated by the encryption scheme or an index for supporting queries with equality or inequality comparison. In this way, the database schema (tables and their attributes) in the implementation does not leak any information about the database in design.

Further in this example, when querying a database the query is still formulated based on the database schema in design. Such queries cannot be executed directly by the DBMS since the database schema seen by the DBMS is different. This example includes a method of rewriting a query formulated based on a database schema in design into a query or multiple queries that can be executed directly on the encrypted databases where the schema is hashed. The query results from the DBMS is processed and verified by using the method of this example before returning the result to database applications.

Example Deployment

Figure 2:
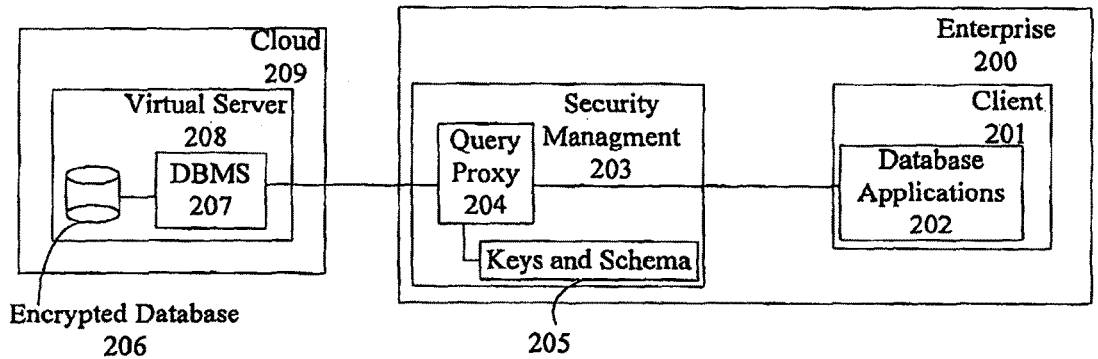
Figure 3:
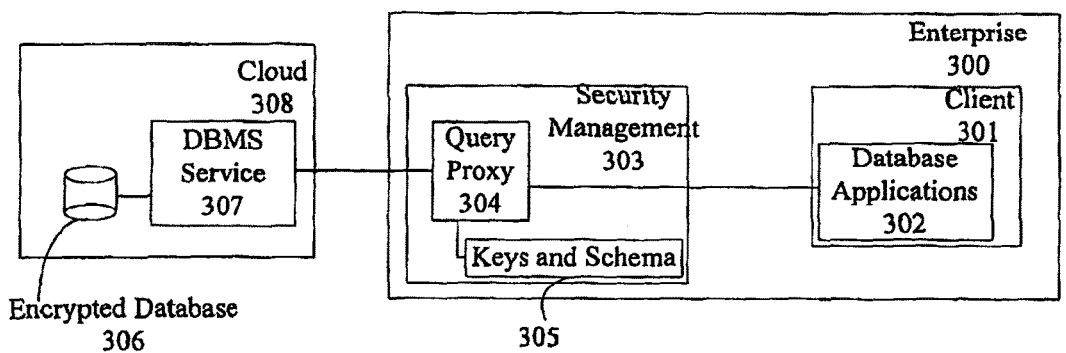

A person skilled in the art will appreciate that many different computing systems can be deployed to support a DBMS. We provide here three examples of such computing systems. In the first deployment (application) environment, an enterprise has its database managed in a DBMS, which is run on a server physically maintained within the enterprise, as shown in FIG. 1. In the second application environment, the enterprise still has its own DBMS, which however runs on a virtual server in a cloud, as shown in FIG. 2. That is, the server is not under the physical control of the enterprise. In the third environment, an enterprise maintains its database on a DBMS service provided in a cloud, as shown in FIG. 3. These three computing systems will now be described in more detail.

In FIG. 1, the server 108 is within the administrative boundary of the enterprise 100, which also manages the multiple machines client 101 and a security management machine 103. Machine is understood here to be any appropriate computing system. The client 101 runs database applications 102. To execute queries (including the database create and update statements), the database applications 102 sends queries to the query proxy 104 on the security management machine 103. Based on the secret keys 105, the query proxy 104 translates a query into one or more queries that will be executed by the DBMS 107 to create, query or update the encrypted database 106. When query results are returned from the DBMS 107, the query proxy 104 deals with the results and sends to the applications 102 the final query result.

Turning now to the security of database in the first application environment shown in FIG. 1, the DBMS 107 runs on the server 108, which is under the physical control of the enterprise 100. When the server 108 is compromised or infected, the data in database 106 are accessible to the attacker or the virus or malware. However, the data are still secure since they are encrypted. On the other hand, the database administrators cannot read the data contents of the database 106 since they are not supposed to access the secret keys 105 according to the principle of separation of duties principle. The security of the application environment can be enhanced by using other separate mechanisms. For example, the keys in 105 can be stored after encrypted, and the access to the DBMS 107 from the query proxy 104 can be regulated under access control.

In FIG. 2, the enterprise 200 installs its DBMS 207 and then loads its encrypted database 206 on a virtual server 208, which is run in a cloud 209. In FIG. 3, the enterprise 300 depends on a DBMS service 307 to manage its encrypted database 306. The DBMS service is provided by a cloud 308. In these two application environments, the enterprise 200 or 300 loses the physical control over its own encrypted database 206 or 306 since the underlying virtual server 208 and the DBMS service 307 are physically managed by the providers of cloud 209 or cloud 308. However, the data contents in the encrypted database 206 or 306 are secure against the cloud providers or the attackers since they are encrypted. The query proxy 204 and 304 are under the physical control of the enterprises 200 and 300, respectively. They are accessed by the database applications 202 and 302, as the query proxy 104 is accessed by the database applications 102.

Note that the encryption scheme described here can be applied to the environments other than the three environments described above. For example, as shown below, an encryption key consists of multiple independent components, and if these components are kept by different principals, then a value can be decrypted only when all principals agree to use their key components. On the other hand, an encrypted value consists of multiple shares, which can be stored distributedly into multiple encrypted databases.

The methods described in further detail below are implemented by security management module 103, 203 or 303 in the relevant application environment. The security management module is in communication with the clients and the DBMS service. The security management module should be seen as a mix of software and hardware, that is a computer processor acting on instructions according to computer instructions that form the software. The security management system has access, typically local access, to a storage medium that stores the relevant keys and schema 105, 205 or 305 information. Not shown, are input and output used by the security management system to perform the methods, such as receive a query from the client and to receive data from the DBMS. A person skilled in the art would appreciate different communication protocols can be used between the client, security management computer system and server/cloud, such as protocols suited for LAN communication between the security management system and client, and WAN communication between the security management system and the computer system that hosts the DBMS Service.

Figure 4:
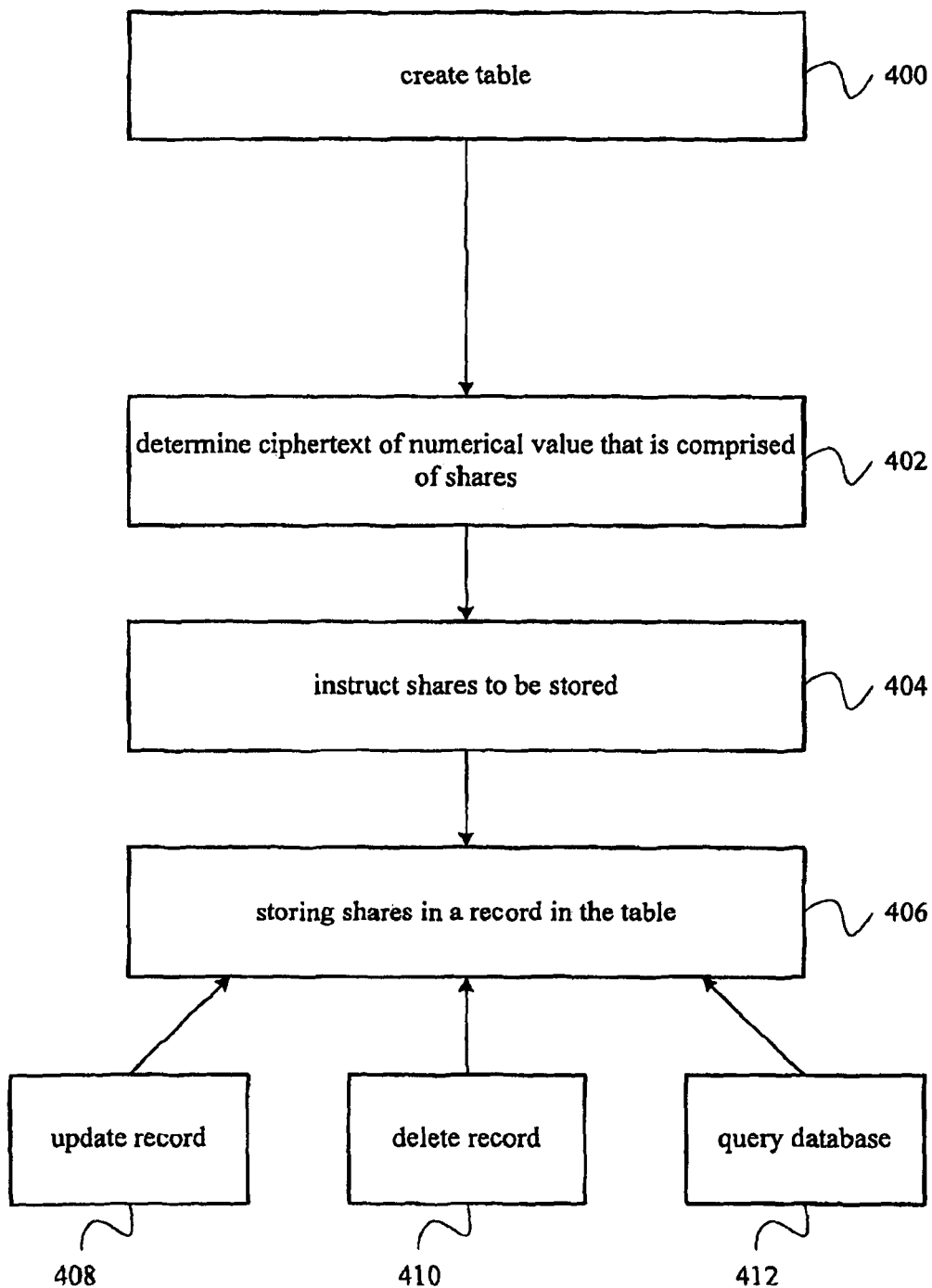
FIG. 4 is a flow chart showing the method of encryption.

The method of this example will now be described with reference to the flow chart of FIG. 4. Firstly, a database suitable for use with these methods must be created 400 and stored in memory 106, 206 or 306. The schema of the database is also stored in memory 105, 205 or 305.

Then for each numerical value, shares are determined 402. This is done with reference to the keys and random numbers also stored in the memory 105, 205 and 305 The security management module 103, 203 or 303 then causes the shares to be stored 404 in the database 106, 206 or 306. This is done by sending the relevant instruction to the DBMS 107, 207 and 307 that then stores 406 the shares.

Once the database is thus populated with shares, operations can be performed on the database 106, 206 and 306, such as updating records 408, deleting records 410 and performing queries 412. Each of these methods performed by the security management module that communicates via the DBMS on the encrypted database.

Each of these steps will be described in further detail below.

Encryption and Decryption Algorithms

We describe here the generic definition of the homomorphic encryption scheme. Homomorphic is a form of encryption which allows specific types of computations to be carried out on ciphertext and obtain an encrypted result which is also the ciphertext of the result of the operations performed on the plaintext.

The key in the encryption scheme is denoted by K(n) in this section, where n (n>1) is the information included in the key K to indicate the number of secret shares in the encrypted result. The bigger n leads to an encryption result more robust to a brute-force attack.

Let Enc be an encryption algorithm of the encryption scheme, called an instance of the encryption scheme. Suppose V is a numeric value to be encrypted. Note that other data types like strings can be converted to numeric types for using the encryption scheme. Then, the encryption scheme is designed to have the following form.

$$\mathrm{Enc}(V, K(n)) = (V_1, \ldots, V_n) \tag{1}$$

In (1), the encryption result is a tuple of n components, corresponding to n sub-ciphertexts (secret shares), which can be put into n columns in a database table. During encryption, the algorithm Enc adds noises (random numbers) into each share $V_i$. Let R denote the set of random numbers used in one encryption of V. Then, $V_i$ in the encrypted result is defined as follows.

$$V_i = \mathrm{Value}_i(K(n), V) + \mathrm{Noise}_i(K(n), R) \tag{2}$$

In the definition of $V_i$ in (2), $\mathrm{Value}_i$ is a function over K(n) and V, in particular linear to V; $\mathrm{Noise}_i$ is a function over K(n) and R, calculating a random number for randomizing $V_i$. To make our scheme scalable with the increase of share numbers, both functions $\mathrm{Value}_i$ and $\mathrm{Noise}_i$ are of linear time complexity with respect to the number of share numbers n. Due to R, the encryption scheme ensures two encryptions of the same value with the same key have different results due to the different random numbers in each encryption. In this way, the encryption scheme is robust against plaintext chosen attacks and ciphertext chosen attacks since the secret keys cannot be recovered by choosing the pairs of plaintexts and their ciphertexts due to noises in the each ciphertext and more pairs containing more noises.

The decryption scheme is designed to have the following form, from which we can see all secret shares are needed to perform a successful decryption.

$$\text{Decry}((V_1, \ldots, V_n), K(n)) = V \quad (3)$$

The encryption scheme must have the following property for its correctness. That is, the decryption result should be the same as the value being encrypted.

$$\text{Decry}(\text{Enc}(V, K(n)), K(n)) = V \quad (4)$$

The Decry algorithm in the present invention is defined as the following expression, where the coefficient $f_i(K(n))$ on the secret share $V_i$ is a function over the key $K(n)$. Again to make our scheme scalable when the share numbers n increases, the function $f_i$ is linear in time complexity with respect to the share numbers n. The expression makes the encryption scheme homomorphic, as described further below.

$$\Sigma_{i=1}^{n} f_i(K(n)) * V_i \quad (5)$$

Based on the definition of $V_i$ in (2), the expression (5) is rewritten into the expression (6), which is equal to the expression (7).

$$\Sigma_{i=1}^{n} f_i(K(n)) * (\text{Value}_i(K(n), V) + \text{Noise}_i(K(n), R)) \quad (6)$$

$$\Sigma_{i=1}^{n} f_i(K(n)) * \text{Value}_i(K(n), V) + f_i(K(n)) * \text{Noise}_i(K(n), R) \quad (7)$$

To satisfy the correctness property (4), the following two conditions must hold by the functions $f_i(K(n))$. $\text{Noise}_i$ and $\text{Value}_i$, which determine the encryption algorithm and decryption algorithm in the encryption scheme.

$$\Sigma_{i=1}^{n} f_i(K(n)) * \text{Noise}_i(K(n), R) = 0 \quad (8)$$

$$\Sigma_{i=1}^{n} f_i(K(n)) * \text{Value}_i(K(n), V) = V \quad (9)$$

That is, if the secret keys $K(n)$ is known, the noises in all shares can be counteracted according to the condition (8), and the original value V can be recovered according to the condition (9). The noises distributed into all shares can be counteracted by processing all shares linearly when the secret key is known. Three instances of the encryption scheme will be described further below with their correctness proved by showing they satisfy the conditions (8) and (9).

Homomorphism

The encryption scheme is additive homomorphic and is also shown also be multiplicative homomorphic. This enables the encryption scheme to support the aggregation operation of SUM and AVG in a query on encrypted databases. In the following, it will be proved that the encryption scheme is homomorphic when conditions (8) and (9) are satisfied.

Suppose $K(n)$ is a secret key. There are m values $V_1, \ldots, V_m$ all encrypted with $K(n)$, as shown below.

$$\text{Enc}(V_1, K(n)) = (V_{11}, \ldots, V_{1n}) \quad (10)$$

$$\text{Enc}(V_m, K(n)) = (V_{m1}, \ldots, V_{mn}) \quad (11)$$

To prove that the encryption scheme in the present invention is homomorphic for the SUM operation in SQL, the following constraint must hold. Note that the encrypted values are added componentwisely in (12).

$$\text{Decry}((\Sigma_{j=1}^{m} V_{j1}, \ldots, \Sigma_{j=1}^{m} V_{jn}), K(n)) = \Sigma_{j=1}^{m} V_j \quad (12)$$

Based on the definition of Decry in (5), the left-hand side of the equation (12) is equal to the following expression, obtained by replacing the $V_i$ in (5) with $\Sigma_{j=1}^{m} V_{j1}$.

$$\Sigma_{i=1}^{n} f_i(K(n)) * (\Sigma_{j=1}^{m} V_{ji}) \quad (13)$$

The expression (13) can be rewritten to the following expression by using distributive law in the elementary algebra.

$$\Sigma_{i=1}^{n} (\Sigma_{j=1}^{m} (f_i(K(N)) * V_{ij})) \quad (14)$$

By using the commutative law in the elementary algebra, the expression (14) is rewritten into the following expression.

$$\Sigma_{j=1}^{m} (\Sigma_{i=1}^{n} f_i(K(n)) * V_{ij}) \quad (15)$$

If the conditions (8) and (9) are satisfied, we have $V_j = \Sigma_{i=1}^{n} f_i(K(n)) * V_{ji}$ according to the definition of Decry in (5). Hence, the expression (15) is equal to $\Sigma_{j=1}^{m} V_j$, and the constraint (12) holds when the conditions (8) and (9) are satisfied.

For the homomorphism of the encryption scheme for the AVG operation, the proof is to show the following constraint is satisfied for the correct encryption and decryption algorithms in the present invention. Note that the average of encrypted values is obtained by dividing the summation of each share by m the number of values encrypted.

$$\text{Decry}((\Sigma_{j=1}^{m} V_{j1}/m, \ldots, \Sigma_{j=1}^{m} V_{jn}/m) \cdot K(n)) = \Sigma_{j=1}^{m} V_j/m \quad (16)$$

Following the proof procedure for the SUM operation, the left-hand side of the equation (16) is equal to the expression below.

$$\Sigma_{j=1}^{m} (\Sigma_{i=1}^{n} f_i(K(n)) * V_{ji}/m) \quad (17)$$

The expression in (17) is further reduced to the following expression.

$$\Sigma_{j=1}^{m} (\Sigma_{i=1}^{n} f_i(K(n)) * V_{ji})/m \quad (18)$$

If the conditions (8) and (9) are both satisfied, the above expression is equal to $\Sigma_{j=1}^{m} V_j/m$, the right-hand side of the equation (16), based on the result of reducing (15). Hence, the constraint (16) holds for the correct encryption and decryption algorithms.

The encryption scheme can be fully homomorphic by also being multiplicative homomorphic in addition. This is a useful scenario where queries are to be run on the database on the encrypted values that requires the multiplication operation. For example, a Staff table includes a Rate column and an Hours column. Then, the SQL query "Select SUM (Rate*Hours) from Staff needs to be both additive and multiplicative homomorphism.

Suppose there are two plaintext messages V and V', and two keys $K(n)$ and $K'(n')$, which can be the same keys or different keys. Using the encryption scheme above, the following ciphertexts can be generated.

$$\text{Enc}(V, K(n)) = (V_1, \ldots, V_n)$$

$$\text{Enc}(V', K'(n')) = (V'_1, \ldots, V'_{n'})$$

Then, the multiplication of two ciphertexts is their outer product, as shown below.

$$(V_1 * V'_1, \ldots, V_1 * V'_{n'},$$

$$\ldots,$$

$$V_n * V'_1, \ldots, V_n * V'_{n'})$$

Decrypting this ciphertext will generate the expected multiplication V*V'. The decryption consists of the following steps.

Step 1: for i from 1 to n, perform the following decryption to get $V_i*V'$.

Decry(($V_i*V'_1, \ldots, V_i*V'_n$),K'(n'))=$V_i*V'$

Step 2: perform the following decryption to get V*V'.

Decry(($V_1*V', \ldots, V_n*V'$),K(n))=V*V'

Instances of the Encryption Scheme

The encryption scheme can be implemented as different instances by giving different definitions of the functions Value, Noise and f(K(n)) used in the definitions of Enc and Decry algorithms. Here five instances of the encryption scheme are described with their correctness conditions (8) and (9) proved. They can be used in the application environments to protect the privacy of the database data, and also used as examples to guide the definitions of other instances.

In this first instance, the key K(n) is a list with n elements (n>1), written as [$k_1, \ldots, k_n$], where each $k_i$ is a real number. It is harder for attackers to guess real number keys for performing brute-force attacks since even in a small range (e.g., from 1 to 10), there can be a large number of real numbers that can be represented in a computer. For this instance, it is required that $k_1+\ldots+k_n-1\neq 0$ and $k_n\neq 0$. The numeric value to be encrypted is represented as V and the encryption result is represented as the tuple ($V_1, \ldots, V_n$). For this instance, the encryption algorithm Enc is defined by the following steps.

Step 1: generates the set R of n−1 random numbers $\{r_1, \ldots, r_{n-1}\}$.

Step 2: produces $V_i$ (1≤i≤n−1) by evaluating the expression $k_i*V+r_i$. That is, Value$_i$(K(n),V)=$k_i*V$ and Noise$_i$(K(n),R)=$r_i$ for 1≤i≤n−1.

Step 3: produces the last component Vn by evaluating the expression $k_n*(r_1+\ldots+r_{n-1})$. That is, Value$_n$(K(n),V)=0 and Noise$_n$(K(n),R)=$k_n*(r_1+\ldots+r_{n-1})$.

Let ($V_1, \ldots, V_n$) be the tuple to be decrypted. The decryption algorithm Decry in this instance is defined by the following steps.

Step 1: computes L, which is defined as $\Sigma_{i=1}^{n-1}k_i$.

Step 2: evaluates the expression $$\sum_{i=1}^{n-1}\frac{V_i}{L}-\frac{V_n}{L*k_n}$$

for the result. That is, fi(K(n))=1/L for 1≤i≤n−1, and fn(K(n))=−1/(L*$k_n$).

For this instance, the left-hand side of equation (8) is $$\sum_{i=1}^{n-1}\frac{r_i}{L}-\frac{k_n*\sum_{i=1}^{n-L}r_i}{L*k_n},$$

which is reduced to 0, and the left-hand side of equation (9) is $$\sum_{i=1}^{n-1}\frac{k_i*V}{L}-\frac{0}{L*k_n},$$

which is reduced to V. Hence, the Enc and Decry algorithms in this instance satisfy the correctness conditions.

In the second instance, more random noises are added to the encrypted tuple. In this instance, the key K(n) is a list of pairs of real numbers, denoted by [($k_1,s_1$), ..., ($k_n,s_n$)], where n>1. It is required that $k_i\neq 0$ for 1≤i≤n, $s_1+\ldots+s_{n-1}\neq 0$ and $s_n\neq 0$. Let V be the numeric value to be encrypted. The encryption algorithm Enc takes the following steps to generate the encrypted tuple ($V_1, \ldots, V_n$).

Step 1: generates the set R of n−1 pairs of random numbers $\{(r_1,p_1), \ldots, (r_{n-1},p_{n-1})\}$.

Step 2: produces Vi (1≤i≤n−1) by using the expression $k_i*(s_i*V+p_i)+r_i$. That is, for 1≤i≤n−1, Value$_i$(K(n),V)=$k_i*s_i*V$ and Noise$_i$(K(n),R)=$k_i*p_i+r_i$.

Step 3: computes Vn by evaluating the expression $s_n*k_n*\Sigma_{i=1}^{n-1}(p_i+r_i/k_i)$. That is, Value$_n$(K(n),V)=0 and Noise$_n$(K(n),R)=$s_n*k_n*\Sigma_{i=1}^{n-1}(p_i+r_i/k_i)$.

The algorithm Decry decrypts the tuple ($V_1, \ldots, V_n$) into V by the following steps:

Step 1: computes S, which is $\Sigma_{i=1}^{n-1}s_i$

Step 2: reduces the expression $$\sum_{i=1}^{n-1}\frac{V_i}{k_i*S}-\frac{V_n}{k_n*s_n*S}$$

for the result. That is, $f_i$(K(n))=1/($k_i*S$) for 1≤i≤n−1, and $f_n$(K(n))=−1/($k_n*s_n*S$).

Compared with the decryption in first instance, each $V_i$ in this decryption algorithm has a different coefficient $f_i$(K(n)) if all keys $k_i$ are different. This increases the difficulty of brute-force attacks in which the coefficient of each $V_i$ has to be exhaustively searched for decrypting V.

The correctness of this instance is checked as follows. For this instance, the left-hand side of equation (8) is the expression $$\sum_{i=1}^{n-1}\frac{1}{k_i*S}*(k_i*p_i+r_i)-\frac{1}{k_n*s_n*S}*s_n*k_n*\sum_{i=1}^{n-1}(p_i+r_i/k_i)$$

which is reduced to 0. The left-hand side of equation (9) for this instance is the following expression $$\sum_{i=1}^{n-1}\frac{1}{k_i*S}*(k_i*s_i*V)-\frac{1}{k_n*s_n*S}*0$$

which is reduced to V as expected.

In this third instance, the key K(n) is represented as [($k_1,s_1$), ..., ($k_n,s_n$)], where n>1, and $k_i$ and $s_i$ are real numbers. This third instance requires that $k_i\neq 0$ for 1≤i≤n, $s_1+\ldots+s_n\neq 0$. Suppose the value V will be encrypted into the tuple ($V_1, \ldots, V_n$). The encryption steps of the Enc algorithm are shown below.

Step 1: generates a set R of n pairs of random numbers $\{(r_1,p_1), \ldots, (r_n,p_n)\}$.

Step 2: produces $V_1$ by using the expression $$k_1*\left(s_1*V+\frac{p_1}{k_1}-\frac{r_n}{k_n}\right)+r_1-p_n.$$

That is, $Value_1(K(n),V) = k_1 * s_1 * V$ and $$Noise_1(K(n), R) = k_1 * \left(\frac{p_1}{k_1} - \frac{r_n}{k_n}\right) + r1 - p_n$$

Step 3: computes each $V_i$ by evaluating the expression $$ki * \left(s_i * V + \frac{p_i}{k_{i+1}} - \frac{r_{i-1}}{k_{i-1}}\right) + r_i - p_{i-1}$$

for $2 \le i \le n-1$. That is, for $2 \le i \le n-1$, $Value_i(K(n),V) = k_i * s_i * V$ and $$Noise_i(K(n), R) = k_i * \left(\frac{p_i}{k_{i+1}} - \frac{r_{i-1}}{k_{i-1}}\right) + r_i - p_{i-1}.$$

Step 4: computes $V_n$ by using the expression $$k_n * \left(s_n * V + \frac{p_n}{k_1} - \frac{r_{n-1}}{k_{n-1}}\right) + rn - pn - 1.$$

That is, $Value_n(K(n),V) = k_n * s_n * V$ and $$Noise_n(K(n), R) = k_n * \left(\frac{p_n}{k_1} - \frac{r_{n-1}}{k_{n-1}}\right) + rn - pn - 1.$$

To decrypt the tuple $(V_1, \ldots, V_n)$, the algorithm Decry takes the following steps.

Step 1: computes S, which is $\Sigma_{i=1}^{n} s_i$

Step 2: reduces the expression $$\sum_{i=1}^{n} \frac{V_i}{k_i - S}$$

for the result. That is, $f_i(K(n)) = 1/(k_i * S)$ for $1 \le i \le n$.

The following is the correctness verification of the instance. The left-hand side of equation (8) for this instance is the expression $N_1 + N_2 + N_3 N_1 + N_2 + N_3$, with each term defined below.

$$N_1 = \frac{1}{k_1 * S} * \left(k_1 * \left(\frac{p_1}{k_1} - \frac{r_n}{k_n}\right) + r_1 - p_n\right) \quad (19)$$

$$N_2 = \sum_{i=2}^{n-1} \frac{1}{k_1 * s} * \left(k_1 * \left(\frac{p_1}{k_{i+1}} - \frac{r_{i-1}}{k_{i-1}}\right) + r_i - p_{i-1}\right) \quad (20)$$

$$N_3 = \frac{1}{k_n * S} * \left(k_n * \left(\frac{p_n}{k_1} - \frac{r_{n-1}}{k_{n-1}}\right) + r_n - p_{n-1}\right) \quad (21)$$

This expression is reduced to 0 since each positive term $$\frac{p_i}{S * k_{i+1}} (1 \le i \le n-1) \text{ or } \frac{p_n}{S * k_1}$$

has the corresponding negative term $$-\frac{p_i}{S * k_{i+1}} (1 \le i \le n-1) \text{ or } -\frac{p_n}{S * k_1},$$

respectively, and each positive term $$\frac{r_i}{S * k_i} (1 \le i \le n)$$

has the corresponding negative term $$-\frac{r_i}{S * k_i}.$$

For this instance, the left-hand side of equation (9) is the expression $$\sum_{i=1}^{n} \frac{1}{k_1 * S} * (k_1 * s_1 * V)$$

which is reduced to V.

A fourth instance is derived from the second instance by adding more noise terms in subciphertexts. The key $K(n)$ in this instance is a list $[k_1, \ldots, k_n]$ and $n \ge 4$. Thus, there exists positive integers h and m, such that $n = h+m+2$. Based on the choice of h and m, the n key component is a tuple of real numbers, as defined below.

For $1 \le i \le h$, each $k_1$ is a tuple $(w_i, S_{i1}, \ldots, s_{im}, t_i)$;

For $h+1 \le i \le h+m$, each $k_1$ is a tuple $(s_{iu}, \ldots, s_{im}, t_i)$, where $u = i-h$;

For $h+m+1 \le i \le n$, each $k_i$ is a singleton tuple $(t_i)$.

For a value V, the encryption algorithm Enc generates the ciphertext $(V_1, \ldots, V_n)$ with the key $K(n)$ by using the following steps.

Step 1: Generate n−1 random numbers: $r_1, r_2, \ldots, r_h$, rr, $rs_1, rs_2, \ldots$ and $rs_m$;

Step 2: For $1 \le i \le h$, $V_i = w_i * t_i * V + \Sigma_{j=1}^{m} s_{ij} * rs_j + t_i * r_i$;

Step 3: For $i = h+1$, $V_i = \Sigma_{j=1}^{h} r_j + \Sigma_{j=1}^{m} s_{ij} * rs_j + t_i * rr$;

Step 4: For $h+2 \le i \le h+m$, $V_i = rs_u + \Sigma_{j=u+1}^{m} s_{ij} * rs_j + t_i * rr$, where $u = i-(h+1)$;

Step 5: $V_{n-1} = rs_m + t_{n-1} * rr$;

Step 6: $V_n = t_n * rr$.

Given the ciphertext $(V_1, \ldots, V_n)$, the decryption algorithm takes the following steps to generate V.

Step 1: $RR = V_n/t_n$;

Step 2: $RS_m = V_{n-1} - t_{n-1} * RR$;

Step 3: For $m-1 \le u \le 1$ and $i = u+h+1$, $RS_u = V_i - t_i * RR - \Sigma_{j=u+1}^{m} s_{ij} * RS_j$;

Step 4: For $i = h+1$, $I = V_i - t_i * RR - \Sigma_{j=1}^{m} s_{ij} * RS_j$;

Step 5: $F = \Sigma_{i=1}^{h}((V_i - \Sigma_{j=1}^{m} s_{ij} * RS_j)/t_i) - 1$;

Step 6: $V = F/\Sigma_{i=1}^{h} w_i$.

A fifth instance is derived from the third instance by adding more noise terms in sub-ciphertexts. The key $K(n)$ in this instance is also a list $[k_1, \ldots, k_n]$ and $n \ge 4$. Thus, there exists positive integers h and m, such that $n = h+m+2$. Based on the choice of h and m, the n key component is a tuple of real numbers, as defined below.

For $1 \leq i \leq h+1$, each $k_1$ is a tuple $(w_i, s_{i1}, \ldots, s_{im}, t_i)$;
For $h+2 \leq i \leq h+m$, each $k_1$ is a tuple $(s_{iu}, \ldots, s_{im}, t_i)$, where $u = i-h$;
For $h+m+1 \leq i \leq n$, each $k_i$ is a singleton tuple $(t_i)$.

For a value V, with the key K(n), the encryption algorithm Enc generates the ciphertext $(V_1, \ldots, V_n)$ by using the following steps.

Step 1: Generate n random numbers: $r_1, r_2, \ldots, r_h, r_{h+1}$, rr, $rs_1, rs_2, \ldots$ and $rs_m$;
Step 2: $V_1 = w_1 * t_1 * V + \Sigma_{j=1}^{m} s_{1j} * rs_j + t_1 * (r_1 - r_{h+1})$;
Step 3: For $2 \leq i \leq h+1$, $V_i = w_i * t_i * V + \Sigma_{j=1}^{m} s_{ij} * rs_j + t_i * (r_i - r_{i-1})$;
Step 4: For $h+2 \leq i \leq h+m$, $V_i = rs_u + \Sigma_{j=u+1}^{m} s_{ij} * rs_j + t_i * rr$, where $u = i-(h+1)$;
Step 5: $V_{n-1} = rs_m + t_{n-1} * rr$;
Step 6: $V_n = t_n * rr$.

Given the ciphertext $(V_1, \ldots, V_n)$, the decryption algorithm Decry works as follows to generate V.

Step 1: $RR = V_n/t_n$;
Step 2: $RS_m = V_{n-1} - t_{n-1} * RR$;
Step 3: For $m-1 \leq u \leq 1$ and $i = u+h+1$, $RS_u = V_i - t_i * RR - \Sigma_{j=u+1}^{m} s_{ij} * RS_j$;
Step 4: $F = \Sigma_{i=1}^{h+1} ((V_i - \Sigma_{j=1}^{m} * RS_j)/t_i)$;
Step 5: $V = F/\Sigma_{i=1}^{h+1} w_i$.

The instances of the encryption scheme in the present invention are composable. The idea is that one share from one instance can be further encrypted by another instance, while for decryption the procedure is reversed. Moreover, the keys, encryption and decryption algorithms from two instances can be fused, providing an easy way to create new instances. That is, the fusion implements the composition of two instances by creating a new equivalent instance.

In the following, the first instance above and the second instance also set out above are taken as examples to explain the fusion of keys, the fusion of their encryption and decryption algorithms.

The fused key in the new instance has the following form, combining the keys of the first and second instances:

$[(k_1, k^1_1, s^1_1), (k_1, k^1_2, s^1_2), \ldots, (k_1, k^1_{n'}, s^1_{n'})$, $\ldots$, $(k_n, k^n_1, s^n_1), (k_n, k^n_2, s^n_2), \ldots, (k_n, k^n_{n'}, s^n_{n'})]$.

Intuitively, $[k_1, \ldots, k_n]$ is the key for the first instance, and for each share i from the first instance, the key for the second instance is $[(k^i_1, s^i_1), \ldots, (k^i_{n'}, s^i_{n'})]$. That is, each share from the first instance is encrypted with a different key by the second instance.

Fused Encryption:

Step 1: generates random numbers: one set of n-1 random numbers $(r_1, \ldots, r_{n-1})$ and other n sets of (n'-1) pairs of random numbers $\{(r^i_1, p^i_1), \ldots, (r^i_{(n'-1)}, p^i_{(n'-1)})\}$, where i is from 1 to n. That is, each share from the first instance is encrypted with different random numbers by the second instance.

Step 2: generates the following n*n' shares for each key component:

$(V^1_1, V^1_2, \ldots, V^1_{n'}$, $\ldots$, $V^n_1, V^n_2, \ldots, V^n_{n'})$.

For the share Vij corresponding to the key component $(k_i, k^i_j, s^i_j)$, it is calculated in one of the following cases:

Case 1: if $i<n$ and $j<n'$, then $V^i_j = k^i_j * (s^i_j * (k_i * V + r_i) + p^i_j) + r^i_j$.
Case 2: if $i=n$ and $j<n'$, then $V^n_j = k^n_j * (s^n_j * (k_n * (r_1 + \ldots + r_{n-1})) + p^n_j) + r^n_j$.
Case 3: if $j=n'$, then $V^i_{n'} = s^i_{n'} * k^i_{n'} * \Sigma_{i'=1}^{n'-1} (p^i_{i'} + r^i_{i'}/k^i_{i'})$ for $1 <= i <= n$.

Fused Decryption:

Step 1: computes L, which is defined as $\Sigma_{i=1}^{n-1} k_i$.
Step 2: for each i, where $1 <= i <= n$, performs the following two steps
Step 2a: computes $S^i$, which is $\Sigma_{i'=1}^{n'-1} s^i_{i'}$.
Step 2b: calculates the intermediate share $$V_i = \sum_{i'=1}^{n'-1} \frac{v^i_{i'}}{k^i_{i'} * s^i} - \frac{v^i_{n'}}{k^i_{i'} * s^i_{n'} * S^i}.$$

Step 3: calculates the final value $$V = \sum_{i=1}^{n-1} \frac{V_i}{L} - \frac{V_n}{L * k_n}.$$

Encryption Examples

FIG. 5 gives five values that will be encrypted by using the three algorithms described before. The values I1 and I3 are designed to be the same value 1383.2. The values I2 and I4 are very close, one 2965.8, the other 2965.7. The value I5 is 3196.1.

The keys used by the encryption algorithm are given in FIG. 6. The first algorithm only uses k1, k2 and k3, while the second and the third also use s1, s2 and s3. Note that the three encryption algorithms allow keys to be real numbers, so keys can be negative.

The encryption of each value needs a set of random numbers. FIG. 7 gives the set of random numbers to be used in the examples. Not all random numbers in FIG. 7 are needed by all three encryption algorithms. Each random number has a name for reference. For example, the random number 178.2 has the name r11.

In the first encryption algorithm example, the five values are encrypted into values shown in FIG. 8. Since the key has components k1, k2 and k3, the encrypt result consists of three shares. For example, the value I1 is encrypted into I1E1, with three shares −1016888.76, 728479.54 and 26137991.5, referred to by notations I1E11, I1E12 and I1E13. In FIG. 8, the expression to computing each share is given below the share. For example, the share I1E11 is from the expression k1*I1+r11.

The decryption result using the first algorithm is shown in FIG. 9. The value I1D1 is the decryption of I1E1, which is the same as I1. The other four decrypted values are also named similarly and equal to their corresponding plaintexts. The expression for decryption is shown under the encrypted value. In FIG. 9, L is the intermediate value used by the decryption algorithm.

FIG. 10 shows the value SumIE1, which is the sum of the encrypted values. SumIE1 consists of three shares, each of which is the sum of the corresponding shares. For example, the first share is the sum of the first shares in the five encrypted values. FIG. 10 also shows the value SumID1, which is the decryption result of SumIE1. In the expression of decrypting SumIE1, SumIE11 denotes the sum of the first encrypted shares. The value SumID1 is the same as the sum I1+I2+I3+I4+I5. L is defined in FIG. 9. Similar to FIG. 10, FIG. 11 shows the average of the five encrypted values, and the decryption of the average. The decrypted average is 2378.8, equal to the expected, average (I1+I2+I3+I4+I5)/5.

FIG. 12 gives the result of using the second algorithm to encrypt the five values in FIG. 5 in a second example. The encrypted results are denoted by I1E2, I2E2, I3E2, I4E2 and I5E2. Each result has three shares since the key has three components [(k1, s1), (k2, s2), (k3, s3)]. The expression used for generating each share is shown under the share in FIG. 11.

The decryption results for individual values are shown in FIG. 13, where S is an intermediate value used by the decryption algorithm. It can be checked that all decrypted values I1D2, I2D2, I3D2, I4D2 and I5D2 are equal to the corresponding values I1, I2, I3, I4 and I5. The expressions for decryption are also shown under each decryption result.

The encrypted values I1E2, I2E2, I3E2, I4E2 and I5E2 are summed in FIG. 14. Each share in the sum SumIE2 is the sum of the corresponding shares. The decryption of the sum SumIE2 using the second decryption is also shown in FIG. 14. The decryption result is 11894, the same as the sum of I1, I2, I3, I4 and I5. FIG. 15 gives the average of the encrypted values, and its decryption using the second decryption algorithm.

In this example, the third algorithm is applied to encrypt I1, I2, I3, I4 and I5, and the result is shown in FIG. 16. In this algorithm, all random numbers in FIG. 7 are used. The expression for generating each share is shown under each encryption result.

FIG. 17 shows the decryption of each individual encrypted values, and FIG. 18 shows' the result of decrypting the sum of encrypted values. All decrypted values are correct since they are either equal to the corresponding value (I1, I2, I3, I4 and I5) or the sum of those values. Finally, the average of the encrypted values is decrypted in FIG. 19.

Management of Encrypted Databases

The query proxy in the three application environments, shown in FIG. 1, FIG. 2 and FIG. 3, takes the role of creating the encrypted databases, querying the encrypted databases, and updating the encrypted databases.

A database usually consists of a set of tables, and each table includes a set of records. The structure of a table is described by a schema. We represent a record as a tuple $(V_1, \ldots, V_n)$, and the corresponding schema as $(A_1: Type_1, \ldots, A_n: Type_n)$, where $A_i$ is an attribute of the table, and $Type_i$ the type of attribute $A_i$. A record must conform to the table schema. That is, $V_i$ must have the type $Type_i$.

The examples here concern the encryption of numeric data and how to perform the aggregation operations of SUM and AVG on them. Hence, we focus on the numeric attributes in a table. The numeric type, represented as NUM, can be integer, float or double. In addition, attributes in a table are protected independently in the present invention. So we describe how to protect one numeric attribute below.

For a numeric attribute, we can assign one or more keys for its encryption. All keys are used to encrypt the attribute value separately by the query proxy. If there are m keys, then an attribute value is encrypted m times separately, generating m encrypted values. To check the integrity of the encrypted values, the query proxy decrypts all of them, and then checks whether they are equal. In the following, we illustrate the management by assigning two keys $K_1(n)$ and $K_2(n)$ to a numeric attribute.

To support queries with equality and inequality comparison, the query proxy needs the hash algorithm, such as the SHA1 algorithm, and the Order-Preserving Encryption (OPE) algorithms. So the query proxy needs to keep other keys for OPE algorithms. For simplicity, we assume the OPE algorithms use the key ikey for one attribute.

An algorithm to hash a value V is denoted as Hash(V). The hash algorithm is also used to hash database names, table and attribute names. Let OPE(ikey, V) denote the encryption of V with the key ikey by using the OPE algorithm. Then, for two values $V_1 < V_2$, an OPE algorithm keeps their orders after encryption, that is OPE(ikey, $V_1$)<OPE(ikey, $V_2$).

Turning now to the creation of encrypted databases and tables, in SQL, the following statement is for creating a database with name dbname.

CREATE DATABASE dbname

Upon receiving this statement from a database application, the query proxy rewrite it to the following statement and sends it to the DBMS or the DBMS service. So the database name is securely hashed into a meaningless string.

CREATE DATABASE Hash(dbname)

When a database application wants to create a table tblname(colname1:NUM, . . . ), it sends the following SQL statement to the query proxy.

CREATE TABLE tblname(colname1 NUM, . . . )

For this statement, the query proxy first stores the table schema tblname(colname1:NUM, . . . ). Then, a random integer i (0<i<n) is generated, where n is obtained from $K_1(n)$ or $K_2(n)$. At last, the statement is rewritten into the following one for the DBMS or the DBMS service.

```
CREATE TABLE Hash(tblname)
(
Hash(colname1+"eq") String,
Hash(colname1+"neq") INT,
Hash(colname1+"k1"+string(i)) Double,
Hash(colname1+"k1"+string(i+1 mod n)) Double,
...,
Hash(colname1+"k1"+string(i+n−1 mod n)) Double,
Hash(colname1+"k2"+string(i)) Double,
Hash(colname1+"k2"+string(i+1 mod n)) Double,
...,
Hash(colname1+"k2"+string(i+n−1 mod n)) Double,
...
)
```

In the query above, string is an operator converting an integer to a string, the operator + is to concatenate two strings, and mod is the modulo operator. The first two columns store indexes of a value for equality and inequality comparisons, respectively. The next n columns store the shares of encrypting a value with the key $K_1(n)$ using the homomorphic encryption algorithm, and the last n columns are for storing the encryption shares using the key $K_2(n)$. The order of shares in the encrypted table is randomized by the random integer i. Since the encryption result is a double value for the homomorphic encryption or a 32 bit integer for the OPE algorithm [5], we use the double or integer data type for the corresponding columns. The hash algorithm HMAC generates a string with a length of 20 bytes for the SHA1 algorithm, so the type of the first column is string.

Turning now to table insertion, suppose some databases and tables have been created. Then, the database applications can insert a new record into the table by using either of the following two statements.

```
INSERT INTO tblname (colname1,...) VALUES (V,...)
INSERT INTO tblname VALUES (V,...)
```

Since the proxy server keeps the table schema, the second insert statement can be translated into the first one. Hence, only the rewriting of the first insert statement is illustrated. For an insert, there are two cases depending on whether V is NULL or not. In the case that V is not NULL, the following steps are used to implement the insert statement. First, the value V is encrypted by using a homomorphic algorithm in the present invention.

$$\text{Enc}(V,K_1(n))=(V_{11}, \ldots ,V_{1n}) \text{ and } \text{Enc}(V,K_2(n))=(V_{21}, \ldots ,V_{2n})$$

Second, a random integer i (0≤i<n) is generated, where n is obtained from $K_1(n)$ or $K_2(n)$. Third, the following insert statement is generated for the DBMS or the DBMS service.

```
INSERT INTO Hash(tblname)
  (
  Hash(colname1+"eq"),
  Hash(colname1+"neq"),
  Hash(colname1+"k1"+string(i)),
  Hash(colname1+"k1"+string(i+1 mod n)),
  ...,
  Hash(colname1+"k1"+string(i+n−1 mod n)),
  Hash(colname1+"k2"+string(i)),
  Hash(colname1+"k2"+string(i+1 mod n)),
  ...,
  Hash(colname1+"k2"+string(i+n−1 mod n)),
  ...
  )
    VALUES (Hash(V),OPE(ikey,V))+rotateL((V11,...,V1n),
    i)+rotateL((V21,...,V2n),
  i)
```

In the above insert statement, the operator + is also used to concatenated several tuples into a bigger tuple. The order of column names for the shares is randomized, and correspondingly the tuple of shares is adjusted to match their column names by using the operator rotateL defined in FIG. 20.

In the case that V is NULL, the proxy query does not encrypt NULL. The following insert statement is sent to the DBMS or the DBMS service, where i is a random integer as above.

```
INSERT INTO Hash(tblname)
  (
  Hash(colname1+"eq"),
  Hash(colname1+"neq"),
  Hash(colname1+"k1"+string(i)),
  Hash(colname1+"k1"+string(i+1 mod n)),
  ...,
  Hash(colname1+"k1"+string(i+n−1 mod n)),
  Hash(colname1+"k2"+string(i)),
  Hash(colname1+"k2"+string(i+1 mod n)),
  ...,
  Hash(colname1+"k2"+string(i+n−1 mod n)),
  ...
       )
       VALUES (NULL,NULL,..., NULL)
```

In the above statement, the number of NULLs in the record is the same as the numbers of attribute columns.

Turning now to query conditions, order By and group by usually included in SQL statements. A condition is usually a logical formula, which is made up of atomic formulas with logical connectives. There are three kinds of atomic formulas, colname=V, colname>V, colname<V, and colname=colname'. When translating a condition in a SQL statement, the query proxy only translates the atomic formulas without changing how they are connected, as shown below.

The formula colname=V is transformed into $$\text{Hash}(\text{colname}+\text{"eq"})=\text{Hash}(V).$$

The formula colname>V is transformed into $$\text{Hash}(\text{colname}+\text{"neq"})>\text{OPE}(i\text{key},V).$$

The formula colname<V is transformed into $$\text{Hash}(\text{colname}+\text{"neq"})<\text{OPE}(i\text{key},V).$$

The formula colname=colname' is transformed into $$\text{Hash}(\text{colname}+\text{"eq"})=\text{Hash}(\text{colname'}+\text{"eq"}).$$

The condition "Order By colname" in a query orders the query result according to the value of column colname. It is transformed into "Order By Hash(colname+"neq")" since the condition needs the order-preserving property of the encrypted value.

The condition "Group By colname" in a query groups the query result based on the value of column colname. It is transformed into "Group By Hash(colname+"eq")" since the condition concerns only the equality of values in column colname.

Table update and deletion is also accommodated for. The database applications can send the following update statement to the proxy server for updating records that satisfy the condition cond.

```
UPDATE tblname SET colname1=V, ... WHERE
    cond
```

If V is not null, the query proxy rewrites the above statement in the following steps, similar to the insert statement. First, V is encrypted by using $K_1(n)$ or $K_2(n)$, respectively.

$$\text{Enc}(V,K_1(n))=(V_{11}, \ldots ,V_{1n}) \text{ and } \text{Enc}(V,K_2(n))=(V_{21}, \ldots ,V_{2n})$$

Second, a random integer i (0≤i<n) is generated, where n is obtained from $K_1(n)$ or $K_2(n)$.

Let $\text{rotateL}((V_{11}, \ldots, V_{1n}), i)=(V'_{11}, \ldots, V'_{1n})$ and $\text{rotateL}((V_{21}, \ldots, V_{2n}), i)=(V'_{21}, \ldots, V'_{2n})$. Third, the following update statement is for the DBMS or the DBMS service.

```
UPDATE Hash(tblname)
    SET Hash(colname1+"eq")= Hash(V),
    SET Hash(colname1+"neq")= OPE(ikey,V),
    SET Hash(colname1+"k1"+string(i))= V'11,
    SET Hash(colname1+"k1"+string(i+1 mod n))= V'12,
    ...,
    SET Hash(colname1+"k1"+string(i+n−1 mod n))= V'1n,
    SET Hash(colname1+"k2"+string(i))= V'21,
    SET Hash(colname1+"k2"+string(i+1 mod n)) = V'22,
    ...,
    SET Hash(colname1+"k2"+string(i+n−1 mod n)) = V'2n,
    ...
    WHERE cond'
```

In the above statement, the condition cond' is the rewriting result of the condition cond. If V is NULL, the following update statement is produced.

```
UPDATE Hash(tblname)
    SET Hash(colname1+"eq")= NULL,
    SET Hash(colname1+"neq")= NULL,
```

```
    SET Hash(colname1+"k1"+string(i))= NULL,
    SET Hash(colname1+"k1"+string(i+1 mod n))= NULL,
    ...,
    SET Hash(colname1+"k1"+string(i+n-1 mod n))= NULL,
    SET Hash(colname1+"k2"+string(i))= NULL,
    SET Hash(colname1+"k2"+string(i+1 mod n)) = NULL,
    ...,
    SET Hash(colname1+"k2"+string(i+n-1 mod n)) = NULL,
    ...
WHERE cond'
```

To delete some records in a table, the database application can use the following statement.

```
DELETE FROM tblname WHERE cond
```

The statement is rewritten into the following one by the query proxy. The condition cond' is the transformation of cond.

```
DELETE FROM tblname WHERE cond'
```

A query may include where conditions, order by and group by. Their transformations have been illustrated in the previous sections. In this section, we suppose the following query statement is used by database applications.

```
SELECT colname1, . . . FROM tblname
```

To implement this query, a random integer i (0≤i<n) is generated by the query proxy, where n is obtained from K1(n) or K2(n). Then, it sends the following to the DBMS or the DBMS service.

```
    SELECT Hash(colname1+"k1"+string(i)),
    Hash(colname1+"k1"+string(i+1 mod n)),
    ...,
    Hash(colname1+"k1"+string(i+n-1 mod n)),
     Hash(colname1+"k2"+string(i)),
    Hash(colname1"k2"+string(i+1 mod n)),
    ...,
    Hash(colname1+"k2"+string(i+n-1 mod n)),
    ...
FROM Hash(tblname)
```

After the above query is executed, the DBMS or the DBMS service returns to the query proxy a set of records. Let Rec denote one of the records. Based on the semantics of the above query, the first n components in a record Rec, denoted as Rec[1,n], are the shares to be decrypted with key $K_1(n)$, and the next n components to be decrypted with key $K_2(n)$, denoted as Rec[n+1,2n]. Before decrypting, the order of these shares needed to be adjusted by using the operator rotateR defined in FIG. 20, so that each share corresponds to the correct key component.

$V=Decry(rotateR(Rec[1,n],i),K1(n))$ and $V'=Decry(rotateR(Rec[n+1,2n],i),K2(n))$ The query proxy verifies the integrity of shares in the encrypted database by comparing V and V'. If they are equal, then the record (V, . . . ) is added to the query result for database applications.

The database applications can query all attribute values in a table by using the following statement.

```
SELECT*FROM tblname
```

Note that all numerical values that are subject of the query are all the numerical values that satisfy the conditions of the query and will be considered in order to process the query. Suppose the table tblname has the schema (colname1: Type1, . . . ). Note that every schema is kept by the query proxy in the application environments. The query proxy translates the following equivalent query, which selects every column explicitly. This query can then be rewritten as described before.

```
SELECT colname1, . . . FROM tblname
```

A SQL query from database applications may include aggregate operations SUM or AVG as shown by below.

```
SELECT Sum(colname1),... FROM tblname
SELECT Avg(colname1),... FROM tblname
```

Let i be a random integer between 0 and n. The query proxy generates the following statement to ask the DBMS or the DBMS service to sum each share column.

```
    SELECT Sum(Hash(colname1+"k1"+string(i))),
    Sum(Hash(colname1+"k1"+string(i+1 mod n))),
    ...,
    Sum(Hash(colname1+"k1"+string(i+n-1 mod n))),
    Sum(Hash(colname1+"k2"+string(i))),
    Sum(Hash(colname1+"k2"+string(i+1 mod n))),
    ...,
    Sum(Hash(colname1+"k2"+string(i+n-1 mod n))),
    ...
FROM Hash(tblname)
```

Let Rec denote one of records returned by the DBMS or the DBMS service. Then, the first n components in Rec are decrypted with $K_1(n)$, and the next n components are decrypted with $K_2(n)$, after their orders are adjusted by using the operator rotateR. If V and V' are equal, then it means all data underlying the summation is integrated, and V is the summation of column colname1.

$V=Decry(rotateR(Rec[1,n],i),K_1(n))$ and $V'=Decry(rotateR(Rec[n+1,2n],i),K_2(n))$ Similarly, a query with the AVG aggregation operation is translated into the following one. The query results from the DBMS or the DBMS service are decrypted and check similarly as above.

```
    SELECT Avg(Hash(colname1+"k1"+string(i))),
    Avg(Hash(colname1+"k1"+string(i+1 mod n))),
    ...,
    Avg(Hash(colname1+"k1"+string(i+n-1 mod n))),
    Avg(Hash(colname1+"k2"+string(i))),
    Avg(Hash(colname1+"k2"+string(i+1 mod n))),
    ...,
    Avg(Hash(colname1+"k2"+string(i+n-1 mod n))),
    ...
FROM Hash(tblname)
```

The queries with MAX and MIN is more complex to query. Suppose the following query is sent from the database applications to the query proxy.

```
SELECT MAX(colname)FROM tblname
```

Let i be a random integer between 0 and n, where n is derived from $K_1(n)$ or $K_2(n)$.

The query proxy generates the following query.

```
    SELECT Hash(colname1+"k1"+string(i)),
    Hash(colname1+"k1"+string(i+1 mod n)),
    ...,
```

```
Hash(colname1+"k1"+string(i+n−1 mod n)),
Hash(colname1+"k2"+string(i)),
Hash(colname1+"k2"+string(i+1 mod n)),
...,
Hash(colname1+"k2"+string(i+n−1 mod n)),
...
FROM Hash(tblname)
WHERE Hash(colname+"eq") =
  (SELECT MAX(Hash(colname+"neq")) FROM Hash(tblname))
```

The above query is a nested query. The subquery returns the maximum from the column Hash(colname+"neq"), then all shares in the same record as the maximum are returned to the query proxy for decryption by using keys $K_1(n)$ and $K_2(n)$. The decrypted result is the maximum of the column colname for database applications. The queries involving MIN operations are translated similarly.

Public Key Encryption

The encryption scheme can be used as a public key encryption scheme. For example, records that include ciphertext can be added to the database by people who do not have sufficient information to decrypt the existing ciphertexts in the database To realise this the private key is the same $K(n)$.

The public key is two sets of ciphertexts
  i. The encryptions of zero, obtained by performing the following encryption a number of times. Note that each encryption generates a new ciphertext due to random numbers. The number of encryptions can be determined by a particular implementation.

$Enc(0,K(n))=(V_1, \ldots, V_n)$ ii. The encryptions of one, obtained by performing the following encryption a number of times. Note that each encryption generates a new ciphertext due to random numbers. The number of encryptions can be determined by a particular implementation.

$Enc(1,K(n))=(V'_1, \ldots, V'_n)$

To then encrypt V, the steps below can be followed.

Step 1: Choose randomly an encryption of one, denoted with $(V'_1, \ldots, V'_n)$ Step 2: Multiply each sub-ciphertexts in this encryption with V, obtaining $(V'_1*V, \ldots, V'_n*V)$ Step 3: Choose randomly a subset of zero encryptions. Suppose this subset has m ciphertexts and denoted as follows. $\{(V_{11}, \ldots, V_{n1}), (V_{12}, \ldots, V_{n2}), \ldots, (V_{1m}, \ldots, V_{nm})\}$ Step 4: Add all zero encryptions in the subset from Step 3, obtaining the ciphertext $(\Sigma_{j=1}^{m}V_{1j}, \ldots, \Sigma_{j=1}^{m}V_{nj})$.

Step 5: Add the ciphertexts in Step 2 and Step 4, obtaining the following result $(V'_1*V+\Sigma_{j=1}^{m}V_{1j}, \ldots, V'_n*V+\Sigma_{j=1}^{m}V_{nj})$.

Compared with the existing methods or systems, overall this example has the following advantages:

Applicable directly to the current database management systems, that is it is retrofittable. Some other techniques need to extend or change the current database management systems. The maximal sum of input values is not needed, hence suitable for long-standing databases.

Encrypted values with substructures that can be stored as numeric data separately in columns in one table or multiple tables. Some other techniques produce big ciphertexts (e.g., 1024 bits),as a blob, which cannot be stored as numeric data, hence hampering the queries involving arithmetic operations (e.g., SUM and AVG).

The encryption robustness is increased by increasing the ciphertext shares, without the need to increase the size of each share. The encryption and decryption algorithms are scalable to the increase of share numbers.

Allows the database table structures to be used to store the encrypted shares.

Encrypted values with random noises, so our encryption scheme is robust to ciphertext or plaintext chosen attacks.

Robustness of the encryption scheme can be increased by increasing the number of shares (with the increasing number of key components), without increasing the size of each share, which can be stored as a numeric value in the current DBMSs.

The encryption method has a generic definition with correctness conditions, allowing new instances of encryption algorithms to be derived from the generic definition, Allows users to define their specific algorithms only used by them to protect their databases.

The size of each encrypted share in our homomorphic encryption does not increase with the number of shares, and the increase of share numbers does not increase computation overhead exponentially. This is efficient since only linear operations are applied the times linear to the size of encryption keys.

Methods provided for rewriting SQL queries and integration with other SQL queries such as using equality and inequality comparison. Also the ability to verify the integrity of the result shows that the example can support both privacy and integrity of databases.

Customizable by following some correctness conditions. That is, a user can define specific homomorphic encryption algorithms by following the correctness condition in the patent.

It will be appreciated by persons skilled in the art that numerous variations and/or modifications may be made to the above-described embodiments, without departing from the broad general scope of the present disclosure.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A computer implemented method for performing a query on a database, wherein a numerical value subject of the query is represented as a ciphertext determined using additive homomorphic encryption, and the ciphertext is comprised of multiple parts including at least a first sub-ciphertext and a second sub-ciphertext, the method comprising:

storing the first sub-ciphertext and the second sub-ciphertext in the database, wherein the first sub-ciphertext and the second sub-ciphertext are part components of the ciphertext such that decryption of the ciphertext requires at least the first sub-ciphertext and the second sub-ciphertext, the first sub-ciphertext and the second sub-ciphertext are stored in separate attributes in the database, and are each determined based on whole of the numerical value, wherein the second sub-ciphertext is determined independently of the determination of the first sub-ciphertext;

generating a query involving a computation to be performed on the first sub-ciphertext and the second sub-ciphertext stored in the database; and performing the computation on the first sub-ciphertext and the second sub-ciphertext to determine an encrypted answer to the query without requiring decryption of the first sub-ciphertext and the second sub-ciphertext.

2. The computer implemented method of claim 1, wherein the additive homomorphic encryption is also multiplicative homomorphic.

3. The computer implemented method of claim 1, wherein the method further comprises a step of:

determining the ciphertext based on a key that is comprised of a set of key components, wherein the number of key components in the set of key components is equal to the number of sub-ciphertexts.

4. The computer implemented method of claim 3, wherein the method further comprises:

determining the set of key components based on the number of sub-ciphertexts.

5. The computer implemented method of claim 3, wherein the key satisfies the following equation:

$$\Sigma_{i=1}^{n} f_i(K(n)) * \text{Value}_i(K(n),V) = V$$

where
V is the numeric value,
n is the number of sub-ciphertexts,
K(n) is the key,
$f_i$ is a i th function over the key, and
$\text{Value}_i$ is a i th function over K(n) and V.

6. The computer implemented method of claim 3, wherein determining the ciphertext comprises determining sub-ciphertexts that satisfy the following equation:

$$\Sigma_{i=1}^{n} f_i(K(n)) * V_i = V$$

where
V is the numeric value,
n is the number of sub-ciphertexts,
K(n) is the key,
$f_i$ is a i th function over the key, and
$V_i$ is a i th sub-ciphertext.

7. The computer implemented method of claim 3, wherein determining the ciphertext comprises determining sub-ciphertexts satisfy the following equation:

$$V_i = \text{Value}_i(K(n),V) + \text{Noise}_i(K(n),R)$$

where
V is the numeric value,
n is the number of sub-ciphertexts,
K(n) is the key,
R is a set of random numbers,
$V_i$ is the i th sub-ciphertext,
$\text{Value}_i$ is a i th function over K(n) and V, and
$\text{Noise}_i$ is a i th function over K(n) and R.

8. The computer implemented method of claim 1, wherein the method comprises the step of:

determining the ciphertext by adding for each sub-ciphertext a first result and a second result, where the first result is the value of a function based on a key associated with that sub-ciphertext and the numerical value, and the second result is the value of a function based on the key associated with that sub-ciphertext and one or more random numbers.

9. The computer implemented method of claim 1, wherein the method comprises the step of:

determining the ciphertext that does not comprise the use of a modulo or floor arithmetic operation.

10. The computer implemented method of claim 1, wherein the method further comprises the steps of:

determining a set of random number components; and
determining the ciphertext based on the set of random number components.

11. The computer implemented method according to claim 10, wherein determining the ciphertext is based on a key that is comprised of a set of key components, wherein the number of key components in the set of key components is equal to the number of sub-ciphertexts, and determining the set of random number components comprises determining a set of random numbers that satisfies the following equation:

$$\Sigma_{i=1}^{n} f_i(K(n)) * \text{Noise}_i(K(n),R) = 0$$

where
n is the number of sub-ciphertexts,
K(n) is the key,
$f_i$ is a i th function over the key,
R is a set of random number components; and
$\text{Noise}_i$ is a i th function over K(n) and R.

12. The computer implemented method of claim 11, wherein the equation is composable and the method further comprising:

fusing multiple instances of the key to create a new key instance.

13. A non-transitory computer readable medium comprising computer-executable instructions stored thereon that when executed cause the computer to perform a query on a database, wherein a numerical value subject of the query is represented as a ciphertext determined using additive homomorphic encryption, and the ciphertext is comprised of multiple parts including at least a first sub-ciphertext and a second sub-ciphertext, the method comprising:

storing the first sub-ciphertext and the second sub-ciphertext in the database, wherein the first sub-ciphertext and the second sub-ciphertext are part components of the ciphertext such that decryption of the ciphertext requires at least the first sub-ciphertext and the second sub-ciphertext, the first sub-ciphertext and the second sub-ciphertext are stored in separate attributes in the database, and are each determined based on whole of the numerical value, and wherein the second sub-ciphertext is determined independently of the determination of the first sub-ciphertext;

generating a query that involves a computation to be performed on the first sub-ciphertext and the second sub-ciphertext stored in the database; and performing the computation on the first sub-ciphertext and the second sub-ciphertext to determine an encrypted answer to the query without requiring decryption of the first sub-ciphertext and the second sub-ciphertext.

14. A computer system for encryption of a numerical value to be stored in a database comprising:
   a processor; and
   a non-transitory computer readable medium storing code, which when executed by the processor, causes the processor to:
   determine ciphertext for the numerical value using additive homomorphic encryption, wherein the ciphertext is comprised of multiple parts including at least a first sub-ciphertext and a second sub-ciphertext that are part components of the ciphertext such that decryption of the ciphertext requires at least the first sub-ciphertext and the second sub-ciphertext, and the first sub-ciphertext and the second sub-ciphertext are determined based on whole of the numerical value, and the second sub-ciphertext is determined independently of the determination of the first sub-ciphertext; and
   cause the first sub-ciphertext and the second sub-ciphertext to be stored in separate attributes in the database, such that, in use, an encrypted result to a query involving a computation on the first sub-ciphertext and the second sub-ciphertext is determined by performing the computation without decryption of the first sub-ciphertext and the second sub-ciphertext, wherein the encrypted result is a ciphertext for a result of the computation performed on the numerical value.

15. A computer implemented method for accessing protected data stored in a database, the method comprising:
   receiving or accessing ciphertext representing a numeric value subject of a query, the ciphertext determined using an additive homomorphic encryption, wherein the ciphertext is comprised of multiple parts including at least a first sub-ciphertext and a second sub-ciphertext that are part components of the ciphertext such that decryption of the ciphertext requires at least the first sub-ciphertext and the second sub-ciphertext, the first sub-ciphertext and the second sub-ciphertext are determined based on whole of the numerical value and stored in separate attributes, and the second sub-ciphertext is determined independently of the determination of the first sub-ciphertext; and
   decrypting the ciphertext to determine a result of the query based on the first sub-ciphertext and the second sub-ciphertext and using an encryption key comprised of a set of key components, wherein the number of key components is the same as the number of sub-ciphertexts.

16. The computer implemented method of claim 1, wherein the method further comprises:
   decrypting the encrypted answer to the query based on keys used to encrypt the numerical value.

17. The computer implemented method of claim 1, wherein the computation is a multiplication based query on the database, the computation comprising:
   for each pair of numerical values subject of the query, performing an outer product of the sub-ciphertexts for that pair of numerical values to determine an encrypted multiplied value.

18. The computer implemented method of claim 1, wherein the storing the first sub-ciphertext and the second sub-ciphertext is performed by creating a table having a first attribute to store the first sub-ciphertext and a second attribute to store the second sub-ciphertext.

19. The computer implemented method of claim 1, wherein the method comprises storing the first sub-ciphertext and the second sub-ciphertext by inserting a record into the database having the separate attributes.

* * * * *

UNITED STATES PATENT AND TRADEMARK OFFICE
CERTIFICATE OF CORRECTION

PATENT NO. : 10,027,486 B2  
APPLICATION NO. : 14/410548  
DATED : July 17, 2018  
INVENTOR(S) : Liu Page 1 of 8

It is certified that error appears in the above-identified patent and that said Letters Patent is hereby corrected as shown below:

In the Specification

In Column 3, Line 11, please delete "$\sum_{i=1}^{n} f_i(K(n)) * Value_i(K(n), V) = V$" and insert --$\sum_{i=1}^{n} f_i(K(n)) * Value_i(K(n), V) = V$--.

In Column 3, Line 24: please delete "$\sum_{i=1}^{n} f_i(K(n)) * V_i = V$" and insert --$\sum_{i=1}^{n} f_i(K(n)) * V_i = V$--.

In Column 4, Line 34: please delete "$\sum_{i=1}^{n} f_i(K(n)) * Noise_i(K(n), R) = 0$" and insert --$\sum_{i=1}^{n} f_i(K(n)) * Noise_i(K(n), R) = 0$--.

In Column 10, Line 59 (Equation (2)): please delete "$V_i = Value_i(K(n), V) \div Noise_i(K(n), R)$" and insert --$V_i = Value_i(K(n), V) + Noise_i(K(n), R)$--.

In Column 11, Line 26, (Equation (5)): please delete "$\sum_{i=1}^{n} f_i(K(n)) * V_i$" and insert --$\sum_{i=1}^{n} f_i(K(n)) * V_i$--.

In Column 11, Line 31 (Equation (6)): please delete "$\sum_{i=1}^{n} f_i(K(n)) * (Value_i(K(n), V) \div Noise_i(K(n), R))$" and insert Signed and Sealed this  
Thirtieth Day of April, 2019

Andrei Iancu  
*Director of the United States Patent and Trademark Office*

CERTIFICATE OF CORRECTION (continued)
U.S. Pat. No. 10,027,486 B2

Page 2 of 8

$$-- \sum_{i=1}^{n} f_i(K(n)) * (Value_i(K(n),V) + Noise_i(K(n),R)) --.$$

In Column 11, Line 33 (Equation (7)): please delete

"$\sum_{i=1}^{n} f_i(K(n)) * Value_i(K(n),V) + f_i(K(n)) * Noise_i(K(n),R)$," and insert $$-- \sum_{i=1}^{n} f_i(K(n)) * Value_i(K(n),V) + f_i(K(n)) * Noise_i(K(n),R) --.$$

In Column 11, Line 39 (Equation (8)): please delete "$\sum_{i=1}^{n} f_i(K(n)) * Noise_i(K(n),R) = 0$," and insert $-- \sum_{i=1}^{n} f_i(K(n)) * Noise_i(K(n),R) = 0 --.$ In Column 11, Line 41 (Equation (9)): please delete "$\sum_{i=1}^{n} f_i(K(n)) * (Value_i(K(n),V) = V$" and insert $-- \sum_{i=1}^{n} f_i(K(n)) * (Value_i(K(n),V) = V --.$ In Column 12, Line 3 (Equation (12)): please delete "$Decry\left((\sum_{j=1}^{m} V_{j1}, ..., \sum_{j=1}^{m} V_{jn}), K(n)\right) = \sum_{j=1}^{m} V_j$," and insert $$-- Decry\left((\sum_{j=1}^{m} V_{j1}, ..., \sum_{j=1}^{m} V_{jn}), K(n)\right) = \sum_{j=1}^{m} V_j --.$$

In Column 12, Line 7: please delete "$\sum_{j=1}^{m} V_{ji}$" and insert $-- \sum_{j=1}^{m} V_{ji} --.$ In Column 12, Line 8: please delete "$\sum_{i=1}^{n} f_i(K(n)) * (\sum_{j=1}^{m} V_{ji})$" and insert $$-- \sum_{i=1}^{n} f_i(K(n)) * (\sum_{j=1}^{m} V_{ji}) --.$$

In Column 12, Line 13 (Equation (14)): please delete "$\sum_{i=1}^{n} (\sum_{j=1}^{m} (f_i(K(n)) * V_{ji}))$" and insert $$-- \sum_{i=1}^{n} (\sum_{j=1}^{m} (f_i(K(n)) * V_{ji})) --.$$

In Column 12, Line 18: please delete "$\sum_{j=1}^{m} (\sum_{i=1}^{n} f_i(K(n)) * V_{ji})$," and insert $$-- \sum_{j=1}^{m} (\sum_{i=1}^{n} f_i(K(n)) * V_{ji}) --.$$

In Column 12, Line 20: please delete "$Vj = \sum_{i=1}^{n} f_i(K(n)) * V_{ji}$," and insert $$-- Vj = \sum_{i=1}^{n} f_i(K(n)) * V_{ji} --.$$

In Column 12, Line 21: please delete "$\sum_{j=1}^{m} V_j$" and insert $-- \sum_{j=1}^{m} V_j --$.

In Column 12, Line 31-32 (Equation (16)): please delete

"$Decry((\sum_{j=1}^{m} V_{j1}/m,...,\sum_{j=1}^{m} V_{jn}/m), K(n)) = \sum_{j=1}^{m} V_j / m$" and insert $$-- Decry((\sum_{j=1}^{m} V_{j1}/m,...,\sum_{j=1}^{m} V_{jn}/m), K(n)) = \sum_{j=1}^{m} V_j / m --.$$

In Column 12, Line 37 (Equation (17)): please delete "$\sum_{j=1}^{m}(\sum_{i=1}^{n} f_i(K(n)) * V_{ji} / m)$" and insert $$-- \sum_{j=1}^{m}(\sum_{i=1}^{n} f_i(K(n)) * V_{ji} / m) --.$$

In Column 12, Line 40 (Equation (18)): please delete "$\sum_{j=1}^{m}(\sum_{i=1}^{n} f_i(K(n)) * V_{ji}) / m$" and insert $-- \sum_{j=1}^{m}(\sum_{i=1}^{n} f_i(K(n)) * V_{ji}) / m --.$ In Column 12, Line 42: please delete "$\sum_{j=1}^{m} V_j / m$" and insert $-- \sum_{j=1}^{m} V_j / m --.$ In Column 13, Line 41: please delete "$\sum_{i=1}^{n-1} k_i$" and insert $-- \sum_{i=1}^{n-1} k_i --.$ In Column 13, Line 46: please delete "$\sum_{i=1}^{n-1} \frac{V_i}{L} - \frac{V_n}{L * k_n}$" and insert $-- \sum_{i=1}^{n-1} \frac{V_i}{L} - \frac{V_n}{L * k_n} --.$ In Column 13, Line 56: please delete "$\sum_{i=1}^{n-1} \frac{r_i}{L} - \frac{k_n * \sum_{i=1}^{n-1} r_i}{L * k_n}$" and insert $$-- \sum_{i=1}^{n-1} \frac{r_i}{L} - \frac{k_n * \sum_{i=1}^{n-1} r_i}{L * k_n} --.$$

CERTIFICATE OF CORRECTION (continued)
U.S. Pat. No. 10,027,486 B2

In Column 13, Line 64: please delete "$\sum_{i=1}^{n-1}\frac{k_i * V}{L} - \frac{0}{L * k_n}$" and insert -- $\sum_{i=1}^{n-1}\frac{k_i * V}{L} - \frac{0}{L * k_n}$ --.

In Column 14, Line 1: please delete "$s_n * k_n * \sum_{i=1}^{n-1}(p_i + r_i/k_i)$" and insert -- $s_n * k_n * \sum_{i=1}^{n-1}(p_i + r_i/k_i)$ --.

In Column 14, Line 16: please delete "$s_n * k_n * \sum_{i=1}^{n-1}(p_i + r_i/k_i)$" and insert -- $s_n * k_n * \sum_{i=1}^{n-1}(p_i + r_i/k_i)$ --.

In Column 14, Line 20: please delete "$\sum_{i=1}^{n-1}S_i$" and insert -- $\sum_{i=1}^{n-1}S_i$ --.

In Column 14, Line 25: please delete "$\sum_{i=1}^{n-1}\frac{V_i}{k_i * S} - \frac{V_n}{k_n * s_n * S}$" and insert -- $\sum_{i=1}^{n-1}\frac{V_i}{k_i * S} - \frac{V_n}{k_n * s_n * S}$ --.

In Column 14, Line 41: please delete
"$\sum_{i=1}^{n-1}\frac{1}{k_i * S} * (k_i * p_i + r_i) - \frac{1}{k_n * s_n * S} * s_n * k_n * \sum_{i=1}^{n-1}(p_i + r_i/k_i)$" and insert
-- $\sum_{i=1}^{n-1}\frac{1}{k_i * S} * (k_i * p_i + r_i) - \frac{1}{k_n * s_n * S} * s_n * k_n * \sum_{i=1}^{n-1}(p_i + r_i/k_i)$ --.

In Column 14, Line 49: please delete "$\sum_{i=1}^{n-1}\frac{1}{k_i * S} * (k_i * s_i * V) - \frac{1}{k_n * s_n * S} * 0$" and insert

CERTIFICATE OF CORRECTION (continued)
U.S. Pat. No. 10,027,486 B2

$$-- \sum_{i=1}^{n-1} \frac{1}{k_i * S} * (k_i * s_i * V) - \frac{1}{k_n * s_n * S} * 0 \quad --.$$

In Column 14, Line 64: please delete "$k_1*(s_1*V+ p①①① k②②①- r②n②② k②n②②)+r_1-p_n$" and insert -- $k_1*(s_1*V+ p①①① k②②①- r②n②② k②n②②)+r_1-p_n$ --.

In Column 15, Line 4: please delete "$k_1*(\frac{p_1}{k_1}-\frac{r_n}{k_n})+r1-p_n$" and insert -- $k_1*(\frac{p_1}{k_2}-\frac{r_n}{k_n})+r_1-p_n$ --.

In Column 15, Line 36: please delete "$\sum_{i=1}^{n} s_i$" and insert -- $\sum_{i=1}^{n} s_i$ --.

In Column 15, Line 41: please delete "$\sum_{i=1}^{n} \frac{V_i}{k_i * S}$" and insert -- $\sum_{i=1}^{n} \frac{V_i}{k_i * S}$ --.

In Column 15, Line 47: please delete the second occurrence of "$N_1+N_2+N_3$".

In Column 15, Line 51 (Equation (19)): please delete "$N_1 = \frac{1}{k_1 * S} * \left(k_1 * \left(\frac{p_1}{k_1}-\frac{r_n}{k_n}\right)+r_1-p_n\right)$"
and insert -- $N_1 = \frac{1}{k_1 * S} * \left(k_1 * \left(\frac{p_1}{k_2}-\frac{r_n}{k_n}\right)+r_1-p_n\right)$ --.

In Column 15, Line 55 (Equation (20)): please delete
"$N_2 = \sum_{i=2}^{n-1} \frac{1}{k_1 * S} * \left(k_1 * \left(\frac{p_1}{k_{i+1}}-\frac{r_{i-1}}{k_{i-1}}\right)+r_1-p_{i-1}\right)$" and insert
-- $N_2 = \sum_{i=2}^{n-1} \frac{1}{k_1 * S} * \left(k_1 * \left(\frac{p_1}{k_{i+1}}-\frac{r_{i-1}}{k_{i-1}}\right)+r_1-p_{i-1}\right)$ --.

In Column 16, Line 23: please delete "$\sum_{i=1}^{n} \frac{1}{k_1 * S} * (k_1 * s_1 * V)$" and insert
-- $\sum_{i=1}^{n} \frac{1}{k_1 * S} * (k_1 * s_1 * V)$ --.

CERTIFICATE OF CORRECTION (continued)

In Column 16, Line 44: please delete "$\sum_{j=1}^{m} s_{ij} * rs_j$" and insert -- $\sum_{j=1}^{m} s_{ij} * rs_j$ --.

In Column 16, Line 45: please delete "$\sum_{j=1}^{h} r_j + \sum_{j=1}^{m} s_{ij} * rs_j$" and insert -- $\sum_{j=1}^{h} r_j + \sum_{j=1}^{m} s_{ij} * rs_j$ --.

In Column 16, Line 46: please delete "$\sum_{j=u+1}^{m} s_{ij} * rs_j$" and insert -- $\sum_{j=u+1}^{m} s_{ij} * rs_j$ --.

In Column 16, Line 57: please delete "$\sum_{j=u+1}^{m} s_{ij} * RS_j$" and insert -- $\sum_{j=u+1}^{m} s_{ij} * RS_j$ --.

In Column 16, Line 58: please delete "$\sum_{j=1}^{m} s_{ij} * RS_{j;}$" and insert -- $\sum_{j=1}^{m} s_{ij} * RS_{j;}$ --.

In Column 16, Line 59: please delete "$\sum_{i=1}^{h}((V_i - \sum_{j=1}^{m} s_{ij} * RS_j)/t_i) - 1$" and insert -- $\sum_{i=1}^{h}((V_i - \sum_{j=1}^{m} s_{ij} * RS_j)/t_i) - 1$ --.

In Column 16, Line 61: please delete "$\sum_{i=1}^{h} w_i$" and insert -- $\sum_{i=1}^{h} w_i$ --.

In Column 17, Line 10: please delete "$\sum_{j=1}^{m} s_{1j} * rs_j$" and insert -- $\sum_{j=1}^{m} s_{1j} * rs_j$ --.

In Column 17, Line 11: please delete "$\sum_{j=1}^{m} s_{ij} * rs_j$" and insert -- $\sum_{j=1}^{m} s_{ij} * rs_j$ --.

In Column 17, Line 13: please delete "$\sum_{j=u+1}^{m} s_{ij} * rs_j$" and insert -- $\sum_{j=u+1}^{m} s_{ij} * rs_j$ --.

CERTIFICATE OF CORRECTION (continued)
U.S. Pat. No. 10,027,486 B2

In Column 17, Line 23: please delete "$\sum_{j=u+1}^{m} s_{ij} * RS_j$" and insert --$\sum_{j=u+1}^{m} s_{ij} * RS_j$--.

In Column 17, Line 24: please delete "$\sum_{i=1}^{h+1}((V_i - \sum_{j=1}^{m} s_{ij} * RS_j)/t_i)$" and insert --$\sum_{i=1}^{h+1}((V_i - \sum_{j=1}^{m} s_{ij} * RS_j)/t_i)$--.

In Column 17, Line 25: please delete "$\sum_{i=1}^{h+1} w_i$" and insert --$\sum_{i=1}^{h+1} w_i$--.

In Column 17, Line 54: please delete "(r1,...,rn-1)" and insert --{r1,...,rn-1}--.

In Column 18, Line 6: please delete "$\sum_{i'=1}^{n'-1}$" and insert --$\sum_{i'=1}^{n'-1}$--.

In Column 18, Line 9: please delete "$\sum_{i=1}^{n-1} k_i$" and insert --$\sum_{i=1}^{n-1} k_i$--.

In Column 18, Line 12: please delete "$\sum_{i'=1}^{n'-1} s^i_{i'}$" and insert --$\sum_{i'=1}^{n'-1} s^i_{i'}$--.

In Column 18, Line 17: please delete "$\sum_{i'=1}^{n'-1} \frac{v^j_{i'}}{k^i_{i'} * s^i} - \frac{v^j_{n'}}{k^i_{i'} * s^j_{n'} * S^i}$" and insert --$\sum_{i'=1}^{n'-1} \frac{v^j_{i'}}{k^i_{i'} * s^i} - \frac{v^j_{n'}}{k^i_{i'} * s^j_{n'} * S^i}$--.

In Column 18, Line 25: please delete "$\sum_{i'=1}^{n'-1} \frac{V_i}{L} - \frac{V_n}{L * k_n}$" and insert --$\sum_{i=1}^{n-1} \frac{V_i}{L} - \frac{V_n}{L * k_n}$--.

In Column 25, Line 40: please delete "$Enc(1, K(n)) = (V'_1,...,V'_n)$." and insert
--$Enc(1, K_1(n)) = (V'_1,...,V'_n)$.--.

CERTIFICATE OF CORRECTION (continued)
U.S. Pat. No. 10,027,486 B2

In Column 25, Line 51: please delete "$(\sum_{j=1}^{m} V_{1j}, \ldots, \sum_{j=1}^{m} V_{nj})$" and insert -- $(\sum_{j=1}^{m} V_{1j}, \ldots, \sum_{j=1}^{m} V_{nj})$ --.

In Column 25, Lines 53-54: please delete "$(V'_1 * V + \sum_{j=1}^{m} V_{1j}, \ldots, V'_n * V + \sum_{j=1}^{m} V_{nj})$" and insert -- $(V'_1 * V + \sum_{j=1}^{m} V_{1j}, \ldots, V'_n * V + \sum_{j=1}^{m} V_{nj})$ --.

In the Claims

In Column 27, Line 40, Claim 5: please delete "$\sum_{i=1}^{n} f_i(K(n)) * Value_i(K(n), V) = V$" and insert -- $\sum_{i=1}^{n} f_i(K(n)) * Value_i(K(n), V) = V$ --.

In Column 27, Line 51, Claim 6: please delete "$\sum_{i=1}^{n} f_i(K(n)) * V_i = V$" and insert -- $\sum_{i=1}^{n} f_i(K(n)) * V_i = V$ --.

In Column 28, Line 31, Claim 11: please delete "$\sum_{i=1}^{n} f_1$" and insert -- $\sum_{i=1}^{n} f_1$ --.